United States Patent [19]

Mach et al.

[11] Patent Number: 5,078,752
[45] Date of Patent: Jan. 7, 1992

[54] COAL GAS PRODUCTIONS COAL-BASED COMBINED CYCLE POWER PRODUCTION

[75] Inventors: Frank V. Mach; Peter P. Mach, both of Coon Rapids, Minn.

[73] Assignee: Northern States Power Company, Minneapolis, Minn.

[21] Appl. No.: 492,597

[22] Filed: Mar. 12, 1990

[51] Int. Cl.$^5$ .............................................. C10J 3/20
[52] U.S. Cl. ................................ 48/77; 48/128; 48/DIG. 2; 110/345; 60/39.12; 60/39.182
[58] Field of Search ............... 60/39.12, 39.182; 110/345; 48/DIG. 2, 128, 77

[56] References Cited

U.S. PATENT DOCUMENTS

| | | | |
|---|---|---|---|
| 2,699,384 | 1/1885 | Perry et al. | 48/206 |
| 2,803,530 | 8/1907 | Ludeman | 48/206 |
| 3,203,175 | 8/1965 | Michalicka et al. | 60/39.152 |
| 3,921,824 | 1/1969 | Herbst | 110/345 |
| 4,008,054 | 2/1977 | Clancey et al. | 44/10 R |
| 4,019,314 | 4/1977 | Springmann | 60/39.02 |
| 4,066,420 | 1/1978 | Danguillier et al. | 48/DIG. 2 |
| 4,089,315 | 5/1978 | Giles | 431/9 |
| 4,462,057 | 7/1984 | Giles et al. | 60/39.02 |
| 4,495,054 | 1/1985 | Claflin | 208/8 R |
| 4,504,043 | 3/1985 | Yamaoka et al. | 266/160 |
| 4,511,372 | 4/1985 | Axelsson | 48/197 R |
| 4,566,392 | 1/1986 | Ishihara | 110/345 |
| 4,572,085 | 2/1986 | Hepworth | 110/345 |
| 4,590,868 | 5/1986 | Ishihara | 110/347 |
| 4,594,140 | 6/1986 | Cheng | 208/414 |
| 4,598,652 | 7/1986 | Hepworth | 110/345 |
| 4,599,955 | 7/1986 | Hepworth et al. | 110/347 |
| 4,685,404 | 8/1987 | Sheppard et al. | 110/265 |
| 4,723,407 | 2/1988 | Goebel | 60/39.1 |
| 4,724,130 | 2/1988 | Statnik | 423/244 R |
| 4,920,898 | 5/1990 | Solbes et al. | 110/345 |
| 4,956,162 | 9/1990 | Smith et al. | 423/244 |

FOREIGN PATENT DOCUMENTS

WO89/01981 3/1989 PCT Int'l Appl. .

OTHER PUBLICATIONS

Rammler et al., *Energy Progress*, 2, 121 (1982).

*Chemical Week*, May 13, 1987.
Department of Energy (DOE) report entitled "Development of an Advanced Continuous Mild Gasification Process for the Production of Co-Products: Industrial Market Assessment of the Products of Mild Gasification" by J. Sinor, Jan. 1988.
Department of Energy (DOE) report entitled "Development of an Advanced Continuous Mild Gasification Process for the Production of Co-Products: Literature Survey Results" by W. G. Willson et al., Jan. 1988.
*Clean Coal Technologies*, 89, 9 (Aug. 1989).
Diehl, "Towards an Environmentally Sound Energy Supply-The Development in the Federal Republic of Germany", *Gas Stream Cleanup Papers from DOE/-METC Sponsored Contractors Review Meeting in 1988*, R. C. Bedic and V. P. Kothari, eds.; U.S. DOE, Office of Fossil Energy, Morgantown Energy Technology Center, P.O. Box 880, Morgantown, W. V. 26507–0880, Oct. 1988.
Wiggers et al., "Hot Gas Cleaning-Status and Development", in *Gas Stream Cleanup Papers from DOE/METC Sponsored Contractors Review Meeting in 1988*, R. C. Bedick and V. P. Kothari, eds.; U.S. DOE, Office of Fossil Energy, Morgantown Energy Technology Center, P.O. Box 880, Morgantown, W. V. 26507–08880, Oct. 1988.

(List continued on next page.)

Primary Examiner—Peter Kratz
Attorney, Agent, or Firm—Merchant, Gould, Smith Edell, Welter & Schmidt

[57] ABSTRACT

An apparatus for the production of hot pressurized coal gas for use, for example, in power generation is provided. The apparatus includes a step of subjecting coal fuel to staged slagging combustion, to generate raw gas and liquid slag. The liquid slag is separated from the raw gas, and the raw gas is then subjected to a mixing and separation procedure, wherein it is treated and cleaned, for exampe of sulfur dioxide content. The raw gases may then be further treated and utilized to advantage in power generation. A preferred arrangement for conducting the process is also described.

10 Claims, 14 Drawing Sheets

OTHER PUBLICATIONS

Hannes et al., "Pressurzed Pulverized Coal Combustion with Molten Ash Removal", in *Gas Stream Cleanup Papers from DOE/METC Sponsored Contractors Review Meeting in 1988*, R. C. Bedtick and V. P. Kothari, eds.; U.S. DOE, Office of Fossil Energy, Morgantown Energy Technology Center, P.O. Box 880, Morgantown, West Virginia 26507-0880, Oct. 1988.

Klara et al., *Paper Presented at Alternate Energy '89, "Mild Gasification: A New Coal Option" (published Apr. 1989)*.

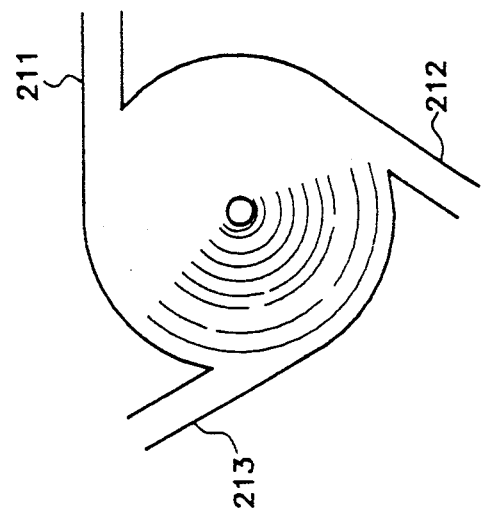
FIG. 8
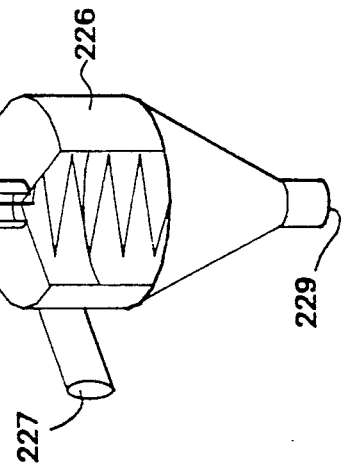
FIG. 11
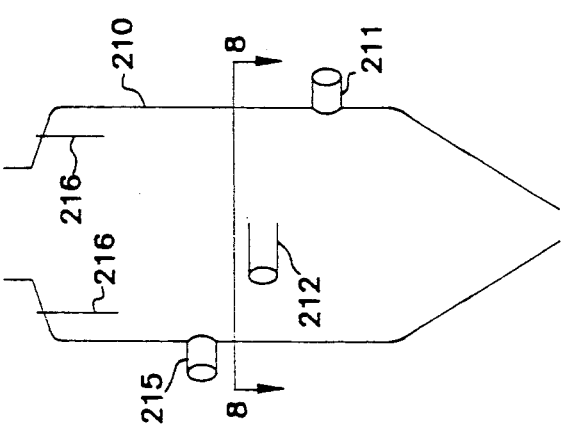
FIG. 7
FIG. 10
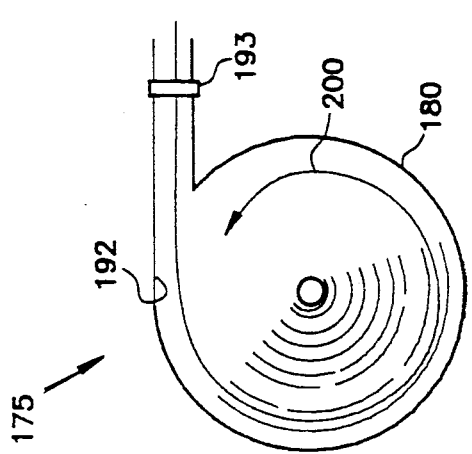
FIG. 6
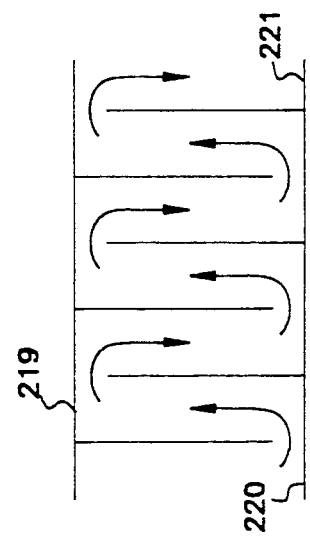
FIG. 9

COAL GAS PRODUCTIONS COAL-BASED COMBINED CYCLE POWER PRODUCTION

FIELD OF THE INVENTION

The present invention generally relates to power production. More specifically, it concerns coal-based power production and/or cogeneration. In preferred applications, the invention concerns combined cycle power generation, and preferred arrangements for achieving the power generation in an environmentally acceptable, relatively efficient and relatively economical manner.

BACKGROUND OF THE INVENTION

Application of conventional thermoelectric power generation processes and equipment has involved numerous problems with respect to: undesired constituents in off gases from the combustion process; and, inefficient utilization of the heat content of the hot combustion gases. Although a variety of methods and processes have been developed to address these problems in various systems, efforts toward improvement are ongoing.

When the combustion fuel is coal, numerous problems are presented. One of these is that the combustion gases of coal include certain particularly undesirable materials therein for release to the atmosphere or which can damage downstream equipment. These include: particulates; oxidized sulfur compounds, generally referred to by their principle component, sulfur dioxide; oxides of nitrogen, typically referred to by the general formula $NO_x$ or the general term "nitrous oxides"; and, $CO_2$, generally considered to be a greenhouse gas. In the United States, there are already controls or limits on the amounts of sulfur dioxide that can be expelled with off gases from coal combustion processes. In many foreign countries, limits have been placed on $NO_x$ emissions, and more limitations may be expected both in the United States and elsewhere in the future. In any event, regardless of governmental limitations, it is generally desirable to maintain $NO_x$, sulfur dioxide, $CO_2$, and particulate emissions from coal combustion processes as low as reasonably and economically possible.

Another problem with coal combustion concerns the fact that residue, i.e. bottom ash, fly ash or slag, is generated when coal is burned. Ash or slag materials are created in huge quantities from coal burning power plants, and in some instances disposal may be a problem. In general, it is preferred to maintain a combustion process such that the ash or slag resulting therefrom is nonleachable, i.e., contains little or essentially no components therein which are leachable therefrom, for example by ground water.

It is noted that carbon dioxide, a principal product of coal combustion, is a greenhouse gas. Thus, it is desirable to maintain its generation at a minimum. This can be effected in part by relatively efficient utilization of the heat energy generated from coal combustion. That is, the greater the thermal efficiency achieved from the coal combustion, the less amount of $CO_2$ generated per energy unit generated. Of course, in general, high thermal efficiencies are desirable, and constantly sought, to improve the economic efficiency of power generation; that is, to generate more electricity at less expense in terms of fuel use.

In FIG. 1, a schematic representation of a typical coal-based power generating cycle is illustrated. During processing, combustion occurs in a boiler 1. Coal is shown fed into the boiler 1, at 2. Air, for combustion, is shown fed into boiler 1 at 3. Within the boiler 1, the coal is combusted under controlled conditions. The boiler 1 includes a heat exchanger 5 therein, with fluid such as water passing therethrough. Released heat from the combusted coal is transferred to the fluid within heat exchanger 5 (for example converting the fluid, if water, to high pressure and temperature steam). Steam flow out from the boiler 1 is indicated at 6. The steam is directed to a steam turbine 8, wherein it expands and drives a turbo generator 9, to generate power. An off steam line from the steam turbine 8, after expansion, is shown at 10. After expansion, via line 10 the steam is directed to a condenser 12 where, under low pressure, it is converted back to water which, via line 13 and by means of pump 14 is recirculated to the boiler 1. Alternatively, the steam may be extracted from the turbine to provide heat for processing or similar purposes in a cogeneration mode. Typically, it is recirculated as shown. A pump to facilitate this is shown at 14.

Combustion gases which form in the boiler 1 are generally transferred therefrom via line 15 through an economizer or preheater arrangement 16, wherein the gases are cooled to a temperature of about 250°-300° F. The heat drawn off from the combustion gases in heat exchanger 16 is used to preheat air directed into the boiler 1, at 3, as combustion air. Air input to the heat exchanger 16 for this purpose, is indicated at 18. The off combustion gases are shown directed via line 19 through a pollution control device 20 whereat undesired materials in the gases are removed. Off gases from the pollution control arrangement 20 are shown directed via fan 21 through stack 22, for discharge to the atmosphere.

The pollution control device 20 is utilized, in various systems, to control a variety of emissions to the atmosphere. For example, the pollution control device 20 may include a scrubber therein, for removal of sulfur dioxide in the flue gases from the boiler 1. Further, the arrangement may include a precipitator or bag house, for removal of particulates.

Although widely used, systems as shown in FIG. 1, have relatively low thermal efficiency (typically 32-35%). Reasons for this include the fact that up to about 50% of heat is lost in the condenser to cooling water, and about 5-7% of heat is lost in flue gas to the atmosphere.

While the efficiency of the cycle could be improved by utilization of more heat from the flue gas, in the past this has not been practical. In general, the flue gas passing through the heat exchange arrangement 5 and/or the air preheater 16 includes fly ash, sulfur compounds and moisture therein. If it is cooled to below about 250° F., moisture condenses and, with sulfur, forms sulfuric acid. Sulfuric acid and dust deposition within equipment such as the preheater 16 would tend to cause problems with corrosion and deposits. The deposits would tend to cut, in time, efficiency of heat transfer; and the corrosion problem will eventually lead to a shorter life of the equipment.

Another reason why off gases from the boiler 1 and heat exchanger 16 are generally not cooled to much below about 250° F., is that if the flue gas line 19 is cooler than this, after it passes through pollution control device 20, it may be so cool that water deposits in stack 22 may occur, or a large, thick, steam or plume cloud will tend to form immediately above stack 22. That is, in general, especially in populated areas, it is desired that the gases emitted from the stack 22 disperse significantly, before substantial condensation occurs, so that the steam cloud or plume is less of a problem. If the gases in the stack 22 are sufficiently cool, this cannot be accommodated. Therefore, in some instances, when the flue gases from the pollution control device 20 are not sufficiently warm, they are reheated during the process of passing them through the stack 22. This consumes energy, and generates greater inefficiency. Flue gas condensers could not readily be used to control moisture content in the flue gases, because they too would be subject to the problems of sulfuric acid formation.

A more efficient generation of power, with reduction of condenser heat losses, has been accomplished through so-called "combined cycle" processes. In typical conventional combined cycle processes natural gas or distillates are used as fuel. Such an arrangement is illustrated in FIG. 2.

Referring to FIG. 2, the natural gas or distillate fuel is shown fed into a combustor 30 via line 31. In combustor 30 the fuel is mixed with compressed air from line 32 (and compressor 33) and is burned under pressure, typically about 2-16 atm but sometimes higher. Hot combustion gases from the burner 30 are shown drawn off at line 35. The gases are shown directed into a gas turbine power generation arrangement including gas turbine 40. In typical operation, the hot gases from line 35 are directed into the gas turbine at temperatures of about 1800°-2300° F., although it is expected that in the near future gas turbine arrangements capable of handling gases up to about 3000° F. will be developed. In the gas turbine 40 the gases are expanded to about atmospheric pressure, and reduced in temperature to about 800°-1000° F. Off gases from the turbine 40 are shown at line 41. The gas turbine 40 is shown powering generator 42, for production of electricity.

Hot exhaust gas from the turbine 40 via line 41 is then directed into a waste heat recovery system or heat recovery boiler/steam turbine power generation arrangement indicated generally at 45. More specifically, the hot gases are directed into a heat recovery boiler 46, at 47. Within heat recovery boiler 46, a heat exchange unit 48 is utilized, to derive heat from the gases, typically upon generation of steam. Steam from the heat exchange unit of the heat recovery boiler 46 is shown drawn off at line 49, and is directed to steam turbine 50. In steam turbine 50, the hot steam is expanded and cooled, to generate power via generator 51. Expanded steam output from turbine 50 is shown directed via line 52 through condenser 53, for cooling. Water output from condenser 53 is shown at line 55. The water is typically recycled to the heat recovery boiler 46, as shown at 56. Pump 58 facilitates the circulation.

The hot gases from line 41, after having been cooled in heat recovery boiler 46 are shown drawn off therefrom at line 59. The gases are then directed through fan 60 and stack 61, for dispersion to the atmosphere. Because both natural gas and distillates are clean fuels, flue gas leaving the heat recovery boiler 46, even at temperatures of about 200°-250° F., can be discharged to the atmosphere directly, without cleanup. Further, a relatively high degree of cooling within boiler 46 can occur, i.e. below 250°-300° F., since the clean fuels have little sulfur component(s) which would present sulfur acid formation problems.

Herein the term "gas turbine power generation arrangement" and variants thereof refers to an arrangement wherein power is generated by expanding a hot gas in a gas turbine. The term "heat recovery boiler/steam turbine arrangement", and variants thereof, refers to arrangements involving power generation by passing hot gases through a boiler to generate steam, and passing the steam through a steam turbine, to generate power.

In typical combined cycle systems approximately ⅔ of power is generated in the gas cycle and only about ⅓ in steam cycle. Consequently, the negative effects of heat losses in the condenser downstream of the steam turbine are reduced drastically. Modern combined cycles generally perform with thermal efficiencies close to 50%. Currently, conventional combined cycle provides approximately 30,000 MWe (megawatt) capacity worldwide.

Because coal represents approximately 90% of all fossil fuel resources, efforts have been developed to find ways for its utilization for "clean" power generation, especially so it can be used as a fuel for combined cycle power generation. For example, for the arrangement of FIG. 2, coal would not be an acceptable fuel source, since combustion gases from coal are generally too contaminated with particulates, sulfur material and nitrous oxides, to be utilized in the equipment shown, or for discharge to the atmosphere as shown.

Coal has been utilized as a source of fuel in atmospheric or pressurized fluidized bed boilers. However, low combustion temperatures of about 1550° F. limit thermal efficiency of the system. That is, coal can be combusted to generate much higher temperature gases, however, they could not be accommodated by conventional fluidized bed boilers.

Limestone, which has been utilized as a sorbent for sulfur capture in fluidized bed systems, contributes to the formation of additional carbon dioxide and flue gases, and increases volume of leachable bottom ash considerably. Further, it appears that $NO_x$ control and fluidized combustion systems will not satisfy new emission standards, and effectiveness of $SO_2$ control has in the past been uncertain for combustion of high sulfur coals.

Coal gasification is a proven method for application in so-called integrated coal gasification combined cycles (IGCC). However, thermal efficiency of the cycle is limited due to cleaning of the coal gas under relatively cold conditions in wet scrubbers. Also, complexity and high costs of the systems appears to be a big barrier for applications in utility industries.

Another problem with high temperature coal gases is that they may include vaporized caustics therein, for example alkali gases from high temperature combustion of coal having alkali impurities therein. Such vapors can be very corrosive to heat transfer surfaces in the heat recovery boiler. This can lead to corrosive buildup on the heat transfer surfaces, generating reduced efficiency of heat transfer. Also, corrosive buildup necessitates increased maintenance, i.e., cleaning; and, it eventually can lead to structural failure, requiring down time and increased capital expenditure. Similar problems can result in the gas turbine as well.

The presence of sulfur dioxide and moisture in coal gas, in practice, has (as suggested above) limited the amount of heat energy that can be derived from the coal gas in the boiler. A reason for this is that if the coal gas is cooled to much below about 250°-300° F. (150° C.) in a boiler arrangement, sulfur acid products from the gas can begin to collect on the heat recovery surfaces in the boiler arrangement. Such products are corrosive, and can damage the heat recovery surfaces, causing problems similar to those discussed above with respect to alkali corrosives. Thus, although coal gases theoretically have a heat content that could be more efficiently utilized if the gases were passed through a heat recovery boiler and were cooled to a greater extent than merely to 300° F., in the past, as a practical matter, they could not be cooled to much below about 300° F.

Another problem with the presence of moisture in cooled coal combustion off gases (as suggested above) concerns the eventual release of the moisture to the atmosphere. If the gases released to the atmosphere are sufficiently cool, immediately upon release to the atmosphere a large, thick, vapor cloud or "plume" will result at the top of the stack. Such large, thick, steam or vapor clouds (or plumes) are generally undesired, especially in urban areas. For this reason, in some instances it has been necessary to reheat the gases at the exhaust stack (i.e., downstream of the heat recovery boiler but prior to release to the atmosphere) to ensure greater dispersion before they cool sufficiently for substantial vapor cloud formation. This has generally necessitated significant heat input at the stack, to ensure that the gases leaving the top of the stack are at about 300°–340° F. (150°–175° C.), lessening the efficiency of overall power generation by the system.

Of course, it is theoretically possible to condense the moisture from the off gases before exhaust to the atmosphere. In the past, this has been infeasible and impractical, because such condensation would generate corrosive materials on the heat transfer surfaces of the condenser, causing similar problems to those discussed with respect to heat transfer surfaces in the heat recovery boiler.

The arrangement of FIG. 2 is generally referred to as a "combined cycle" arrangement, since two cycles for power generation are provided: a gas turbine cycle and a steam turbine cycle. Coal gas has not been utilized in many such systems, at least in part due to undesirable properties of cool gas causing problems generally similar to those discussed above with respect to conventional heat recovery boiler systems. That is, compressor and/or gas turbine arrangements are susceptible to interference from, or damage caused by, particulates and/or other constituents in hot coal gases. In fact, such equipment is generally more expensive, and more sensitive to such constituents in the gases, than are conventional heat recovery boilers.

As indicated previously, in general it is preferable to reduce or limit the amount of nitrous oxide ($NO_x$) emitted in off gases from power generation. Nitrous oxides are formed as products in many combustion process off gases, including those from natural gas combustion. That is, among the off gases from burner 30, FIG. 2, one could expect nitrous oxide emissions. While it has generally been found that treatment of combustion gases with water at high temperatures can minimize nitrous oxide production (by reaction to nitrogen, oxygen and hydrogen) if such a process were to be conducted in the schematic of FIG. 2, the gas turbine 40 would have to be constructed and arranged to accommodate the water treatment process. Since for many gas turbine arrangements the burner forms part of the system, this would be expected to lead to an increase in the cost of preparation, design and maintenance of the gas turbine. That is, in general conventional gas turbines are not readily adaptable to such water treatment processes.

An overall schematic for a system utilizing a coal-based combined cycle has been developed: see U.S. Pat. No. 4,590,868 to Ishihara, the disclosure of which is incorporated herein by reference. In the Ishihara system, coal is combusted under pressurized conditions to generate hot pressurized off gases. The off gases are cleared of particulates via a multi-step dust removal arrangement. The pressurized gases are then directed through a combined cycle system for power generation. After power generation and before the gases are discharged into the atmosphere, they are directed through a conventional cleaning operation for scrubbing sulfur dioxide, before discharge to the atmosphere.

SUMMARY OF THE INVENTION

According to the present invention there is provided a process and arrangement for the production of a preferred coal gas, for example for use in generating power and/or for cogeneration; and, there is provided a process for the generation of power, and an apparatus for the generation of power, to advantage.

A preferred process for the production of coal gas according to the present invention includes the steps of: combusting coal under conditions sufficient to generate raw coal gas having a pressure of at least about 2 atmospheres (preferably at least 5 atmospheres) and a temperature of at least about 2200° F. (preferably at least 2600°–3000° F.); and, ash as liquid slag. The process includes a step of separating at least 90% of ash formed as the liquid slag, and preferably at least 95% of the ash as the liquid slag, from the hot gases. After the step of separating at least 90% of the ash as liquid slag from the raw coal gas, the gas is subjected to a mixing and separation operation preferably including a step of treating with a component or components suitable for cleaning the gas of undesired component(s). In preferred applications this involves mixing sorbent material(s) active for $SO_2$ absorption with the raw coal gas, and separating the sorbent material from the coal gas to provide a low $SO_2$ coal gas. When conducted in this manner, the process yields a relatively clean, low $SO_2$, coal gas for utilization in processes such as power generation. Advantages are obtained from the fact that the liquid slag is separated from the coal gas, before the coal gas is treated for $SO_2$ content; and, from the fact that the coal gas is rendered in a state having a low $SO_2$ content, before it is utilized in downstream processes of hot gas cleanup and/or power generation. Advantages relating to this, are described in detail below. It is noted that during the step of mixing and separation sorbents may be added for other components, such as alkaline materials.

Preferably the step of mixing and separation includes directing the raw coal gas, following the slag separation, into a circular separator arrangement having a substantially vertical central axis, in a helical path of motion about the vertical central axis. In this manner, advantage can be taken of the helical flow of gases to generate intimate mixing with the sorbent material (for example $SO_2$ sorbent), improving absorption and cleaning. Also, separation of the sorbent from the gases, after the mixing, is facilitated.

In preferred processes, after the step of mixing and separation, with sorbent treatment, the gases are transferred through a hot gas cleanup arrangement, for separation of any remaining problem particulate material.

The step of hot gas cleanup may include: passage of the low $SO_2$ coal gas through a filter arrangement; passage of the low $SO_2$ gas through an impact separator arrangement; and or passage of the low $SO_2$ coal gas through a cyclonic separator. A variety of hot gas cleanup arrangements suitable for this purpose are described in *Gas Stream Cleanup Papers from DOE/-METC Sponsored Contractors Review Meetings in* 1988, Ed. by R. C. Bedick and V. P. Kothari, U.S. Dept. of Energy, Morgantown Energy Technology Center, P.O. Box 880, Morgantown, W. Va. 26507-0880, incorporated herein by reference.

The process of mixing and separation, with a concomitant sorbent treatment, is advantageous in that it facilitates the utilization of a variety of sorbents, as described below. For example, dry lime (preferably having a particle size of about 0.5 mm to 1.0 mm) may be utilized as the sorbent. This is advantageous, since the material is relatively fine and has a high surface area, for activity in cleaning the coal gas. Alternate sorbents which may be utilized to advantage include metal-based sorbents such a iron materials, copper-based sorbents and zinc-ferrite sorbents, since the conditions of the mixing and separation allow the sorbent material(s) to be maintained in an active state. Also, the pressurized system facilitates absorption processes. If desired, the sorbent material collected from the mixing and separation may be recirculated through continuous cleanup processes, for example until spent.

In preferred processes, the step of mixing and separation is conducted with a temperature of about 2000°–2600° F., depending on the particular sorbent used. Also, preferably the follow-up step of hot gas cleanup is conducted at temperatures of about 1700°–2000° F., more preferably no greater than about 1900° F. Therefore, preferred processes involve a step of cooling the gases following mixing of the sorbent material into the hot process gases. This may be done by the direct injection of coolant, or indirect cooling systems utilizing heat exchange arrangements. Direct injection of coolant may be by injection of water, air or both, either directly into the reactor system for the mixing and separation, or downstream therefrom. Indirect cooling may be accomplished through utilization of a fluid cooled (for example air or water cooled) heat exchanger, either strategically positioned in the reactor whereat the mixing and separation take place, or positioned downstream therefrom.

Again, preferably the step of mixing and separation is conducted in a pressurized reactor vessel having a generally circular horizontal cross-section and defining a central vertical axis. More preferably, the arrangement is such that the reactor has an upper portion and a lower portion, and gas input from the step of slagging combustion is provided in the lower portion and is directed in a manner to cause helical flow within the reactor. Preferably sorbent introduction is at a position above the gas input from slag and combustion. If air and/or water are injected into the system, preferably it is done in an upper portion of the reactor, clear of the region immediately in vicinity of the gas flow from slagging. If a heat exchanger arrangement is utilized, preferably it is positioned in an upper portion of the reactor well out of direct impact flow of gases from the slagging combustor.

In general, except for equipment associated with injection of air, water or sorbent, preferably the reactor utilized in processes according to the present invention is an open one-chamber vessel arrangement generally free of internal structures, which would otherwise be susceptible to fatigue or other problems associated with the extreme conditions therein. If a heat exchange arrangement is utilized to cool gases within the reactor, preferably it is located in an upper portion of the reactor out of direct impact with gas flow incoming from the slagging combustor.

In certain preferred processes, off gases from the hot gas cleanup are subjected to a follow-up booster combustion, for example by means of a booster burner, to increase their temperature prior to use, for example to generate power. Combustible fuel for use in the booster burner process may be provided by: auxiliary fuel such as natural gas or distillates; or, through generation of raw coal gas in the slagging combustion operation and reactor operation which has a combustible component therein. This latter can be done by using insufficient amounts of air ($O_2$) for complete combustion.

Coal gas prepared according to the processes generally described above is preferably utilized in the production of energy through a step of passing the gases through a gas turbine power generation process, wherein a pressure of the gases is reduced to about atmospheric. Hot off gases from the gas turbine power generation arrangement may be directed through a second cycle of power generation, preferably a heat recovery boiler/steam turbine power generation arrangement. Because the gases are substantially free of $SO_2$, they may be released from the power generation cycles to the atmosphere without an $SO_2$ scrubbing step. Further, heat recovery at the heat recovery boiler/steam turbine generation arrangement may be conducted to advantage, since the gases can be cooled to substantially below 300° F., and preferably to substantially below 200° F. and even below 180° F., i.e. at about 160° F. Also, if desired, the gases may be subjected to a condensation process after the heat recovery boiler/steam turbine power generation, to recover moisture therein. Advantages that allow for this, and result from this, are described in the Detailed Descriptions below.

It is noted that the process may be used to provide a low BTU, clean, coal gas, through control of air ($O_2$) and water (or steam) input to the reactor. Thus, some aspects of the process may be adapted to uses other than power generation.

DETAILED DESCRIPTION OF THE INVENTION

As required, detailed descriptions of the present invention are disclosed herein. The descriptions are intended to be exemplary only; i.e. representative of the processes, techniques and mechanisms of preferred applications of the present invention. It will be understood that these details are not to be interpreted as limiting, but rather as a basis for the claims and a representative basis for teaching those skilled in the art how to apply the invention in virtually any appropriately detailed system or manner.

The preferred processes described herein may be referred to as a coal-based advance combined cycle (ACC) system. Such a system can use many of the basic components of a conventional combined cycle system, but it involves creation of new combustion gases from combustion of coal rather than natural gas or distillates, to advantage. Because blades of gas turbines must be protected against solid particles and various chemical substances resulting from coal combustion, it is essential that the hot coal gas be cleaned before it enters the gas turbine. Similarly, advantageous use of the downstream heat recovery boiler will result, since the gases therein may be cooled to a greater extent, without problems from sulfuric acid depositions. It will be understood that since emission levels of sulfur dioxide are controlled via processes according to the invention, in general conventional post-combustion environmental controls such as scrubbers, electrostatic precipitators, bag houses or similar arrangements, commonly used in coal-based power generation downstream of the boiler, are avoided to advantage. Similarly to sulfur dioxide control, $NO_x$ and in some instances $CO_2$ control may also be obtained.

In general, processes according to the present invention utilize pulverized coal (or other fossil fuels) as fuel, with slagging type burners integrated with a reactor vessel and hot gas cleanup, to create and clean coal gases. Because hot combustion gases delivered to the gas turbine should be pressurized, the described processes typically will occur under pressures of about 2 to 30 atmospheres, and eventually higher pressures will be usable, when more advanced gas turbines are developed.

Figure 3:
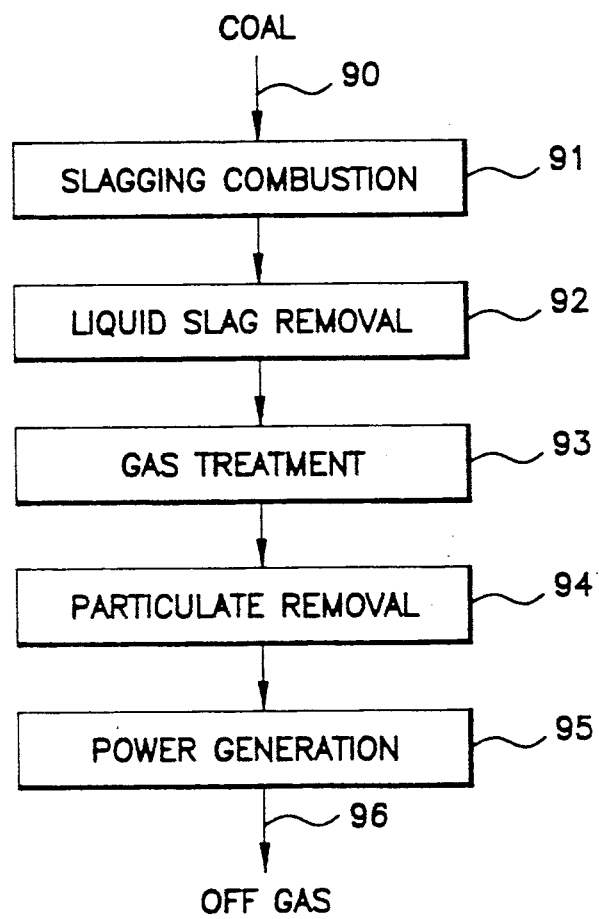

In FIG. 3, a flow diagram is provided which reflects preferred processes and systems according to the present invention. In general, coal is shown fed into the system at 90. In a first step, 91, the coal is subjected to slagging combustion. The slagging combustion is conducted such that: raw coal gas having a temperature of at least about 2200° F. and more preferably about 2600°-3000° F.; and, ash (as liquid slag) are formed. At a next step, 92, the liquid slag is separated from the raw coal gas. Preferably, at least 90%, more preferably 95°-100%, of ash formed from combustion is removed in the step represented at 92, as liquid slag.

The raw coal gas, having liquid slag removed therefrom, is then directed into a mixing and separation treatment stage 93. In this stage, treatment of the gases for cleaning takes place; in preferred applications to provide substantial $SO_2$ removal. Herein, the term "substantial $SO_2$ removal" and variants thereof, in this context, is generally meant to refer to sufficient removal of the $SO_2$ from the gases, to ultimately provide emission levels below acceptable levels for dispersion to the environment and/or for protection of downstream processes or equipment. In general, preferably at least 60% and more preferably at least 98% of the sulfur dioxide in the hot gases is removed at stage 93.

Following the $SO_2$ treatment, the hot gases are treated for any particulate removal that may be necessary, for example to remove fine fly ash or other particulates carried by the gases from the slagging combustion operation and which were not otherwise removed during the sulfur dioxide treatment stage. It is preferred to obtain, in the particulate removal step 94, a reduction of at least 99%, and more preferably at least 99.5%, by weight of the amount of particulates entrained in the gas stream following the $SO_2$ treatment stage. In general, the goal of the particulate removal stage is to achieve: sufficient removal of particulates for protection of downstream equipment; and, particulate emission levels at or below acceptable environmental pollutant control levels.

The hot, low $SO_2$, low particulate, gases from stage 94 are then directed to a power generation process 95 for power generation. Preferably the power generation process 95 is a combined cycle or cogeneration process. In general, the preferred power generation process involves: a step of expanding the gases in a gas turbine power generation arrangement; and, a follow-up step of cooling the gases in a heat recovery boiler/steam turbine power generation arrangement. At step 96, the off gases are shown released to the environment.

Advantages obtainable from systems according to the flow chart of FIG. 3, and specific preferred arrangements for achieving the processes reflected therein, will be understood from the following more detailed descriptions. In general, the steps of the process, and preferred apparatus used, are arranged such that: advantageous gas treatment can be conducted; and, advantage may be taken of low sulfur dioxide hot coal combustion gases being transferred into the combined cycle power generation stage, as combustion gases.

Figure 4:
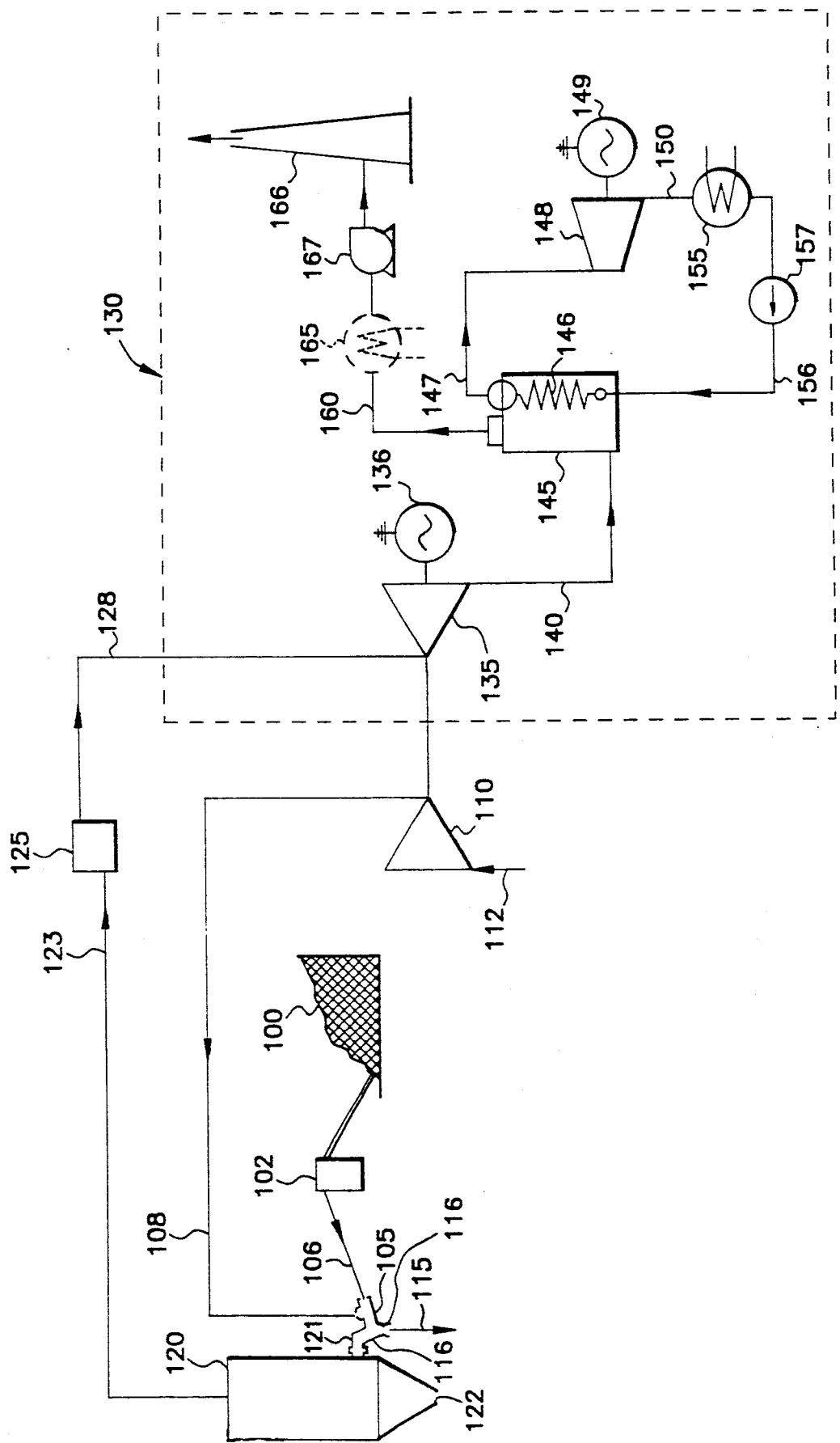

Referring to FIG. 4, a general overall schematic diagram is presented which illustrates many of the principles of the present invention, in a preferred application. Referring to FIG. 4, reference numeral 100 generally designates coal fuel for use in a coal-based combined cycle operation as reflected in the schematic. Because the system is preferably operated under substantial pressure, as described below, pulverized coal 100 should be delivered into the system under appropriate pressure. Two general methods can be utilized to accomplish this: pneumatic supply of dry, pulverized, coal; or, coal slurry supply (pulverized coal in aqueous slurry). Reference numeral 102 generally indicates an arrangement for appropriate delivery of the coal 100 into the system, regardless of the specific process selected. Herein the term "pulverized coal" in this context means substantially powdered. Coal sizes on the order of about 0.5 mm, and generally 0.1-10.0 mm are preferred.

In a first step, combusting of the coal is undertaken under conditions sufficient to generate: raw coal gas having a pressure of at least 2 atm (preferably at least 5 and more preferably 6-30 atm) at a temperature of at least about 2200° F. (more preferably at least about 2600° F.); and, ash as liquid slag.

In FIG. 4, the coal is shown combusted in a slagging combustor 105. The coal is shown fed thereto via line 106. Air, under pressure, is fed to the slagging combustor 105 via line 108. Pressurized air in line 108 is generated at compressor 110 from atmospheric air provided at 112.

In the slagging combustor 105, the coal is combusted under pressure and conditions in which rapid combustion occurs, with the formation of coal ash in the form of liquid slag. The liquid slag is shown drawn off from slagging combustor 105 via line 115 from exit 116. Pressurized gases from the slagging combustor 105, substantially free of the slag, are then directed into a reactor arrangement or reactor 120, via exit gas 121. As will be seen from the following descriptions, it is significant that the liquid slag is removed from the raw coal gases before they are transferred into the reactor 120. For advantages obtainable according to processes described herein, what is generally desired and obtainable is a removal of at least 90% of the ash content as liquid slag, and more preferably 95-100% of the ash content as liquid slag, from the gases before the gases are directed into the reactor 120. In the reactor 120, the hot gases are in part separated from entrained particulates, and are treated as desired with sorbents for cleaning, for example for reduction in sulfur content. Further treatments may take place in the reactor 120, as explained in detail below. Particulates added to reactor 120 may be removed via bottom exit 122.

Figure 1:
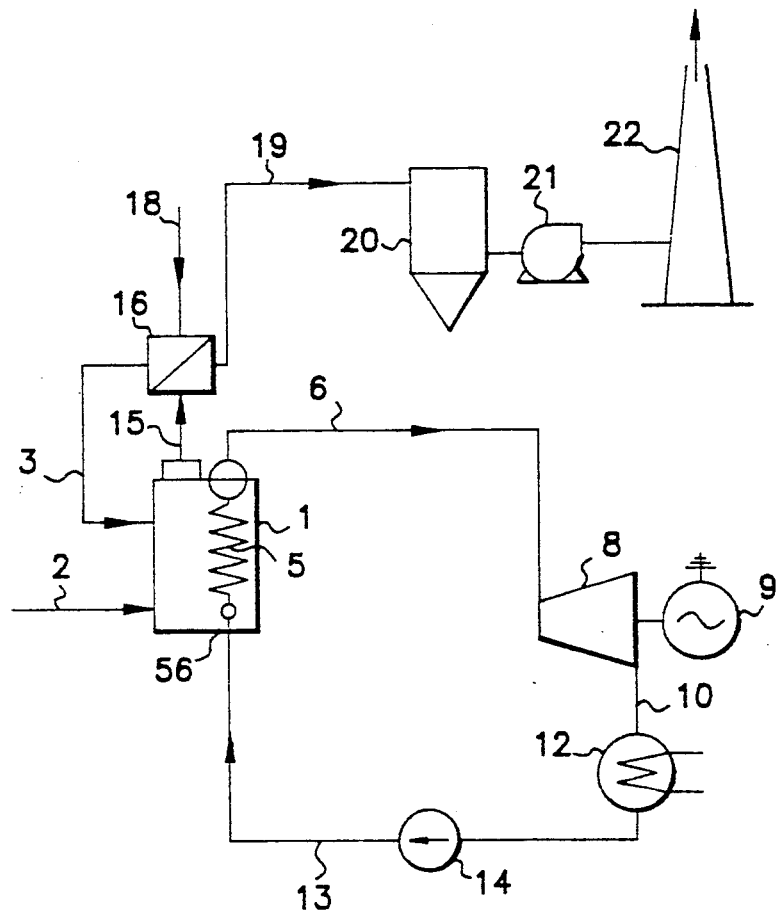

Still referring to FIG. 1, the hot gases are removed from the reactor 120 at line 123. The hot gases in line 123 can be provided substantially free of sulfur dioxide, due to treatment processes conducted in reactor 120. This, it will be understood from descriptions herein, facilitates power generation at later steps. It is noted that $NO_x$ formation may also be limited, by the conditions of slagging combustion and, if desired, treatments within the reactor 120.

The gases from reactor 120, in line 123, will generally still include entrained therein some fine particulates. In general, it is desirable that the gases be rendered free of these fine particulates to the greatest extent reasonably possible, at least: to achieve improvement in processes conducted downstream; to inhibit damage to downstream equipment; to inhibit plugging or other deleterious effects in downstream processes; and, to ultimately prevent emission to the atmosphere.

To remove entrained fine particulates from the off gases of reactor 120, line 123 is directed through hot gas cleanup arrangement 125. Some details concerning preferred arrangements utilizable in hot gas cleanup arrangement 125 are provided below; and, conventional hot gas clean up systems and arrangements may be used. In general, treatments undertaken in reactor 120 to pretreat the gases will facilitate hot gas cleanup operation in arrangement 125. The reasons for this include the fact that the reactor 120 itself will generate considerable solids drop-out.

Hot, substantially particulate-free, gases from arrangement 125, are shown exiting hot gas cleanup via line 128. These hot gases, still under pressure, are then directed into a combined cycle power generation phase indicated generally in the region outlined and designated at reference numeral 130.

Initially, the hot pressurized gases are directed into gas turbine 135 for expansion and electric power generation as indicated at generator 136. Gases exiting the gas turbine at line 140 will generally be hot, substantially atmospheric pressure, gases having a heat value appropriate for further generation of energy. In typical processes according to the present invention the off gases from the gas turbine will be at about 900°–1000° F. (480°–540° C.). These gases are directed via line 140 into heat recovery boiler 145, having heat exchanger 146 therein. Steam generated in heat recovery boiler 145 is shown directed via line 147 to steam turbine 148 for expansion and generation of electric power at generator 149. Expanded steam/water removed from turbine 148 is shown at line 150, directed into final heat exchange arrangement or condenser 155 before being recycled back into the heat recovery boiler 145; outlet water flow from condenser 155 being shown a 156; recirculation being controlled by pump arrangement 157.

The coal gases, from which heat is transferred in heat recovery boiler 145, are expelled from boiler 145 at line 160. Since these gases are substantially free of sulfur dioxide and particulates, several advantages will have been obtained. First, a follow-up $SO_2$ scrubbing arrangement or process will not be required, for the gases to be released to the atmosphere. Secondly, a greater degree of heat exchange can be undertaken in heat recovery boiler 145 than is possible with conventional systems, since formation of sulfur acid corrosives (that would otherwise form on heat exchange surfaces in the heat recovery boiler 145 or downstream heat exchanger) is avoided or inhibited to advantage (because the $SO_2$ content is low). For example they may be cooled to less than 250° F., and indeed to about 160°–180° F. Also, if desired, moisture in the gases of line 160 can be condensed therefrom in a cooling/condenser arrangement such as arrangement 165, by cooling the flue gases to about 140°–160° F. The heat recovery from the flue gases may also be used, increasing efficiency. With this latter modification, since the moisture is removed from the gas line, the gases can then be vented or released to the atmosphere relatively cool, and with less problems with vapor cloud or plume formation. Of course, the gases from line 160 can be released through a conventional stack system 166 without moisture removal. However, reheating may be necessary or plume problems would otherwise result. Fan 167 is shown, for directing the flue gases up the stack system 166.

Hereinbelow, the flexibility of the arrangement shown in FIG. 4 is exemplified: through descriptions of modifications to the scheme that may be utilized to take advantage of certain features and enhance operations under certain circumstances; and, through descriptions of processes whereby conventional, inefficient, energy production systems can be modified efficiently and effectively to achieve enhanced energy production and environmental controls. Before these descriptions are provided, an examination will be made of specific steps of the general process described above with respect to FIG. 4 and equipment that may be used therein.

The Slagging Combustor and Reactor System

Many unique features and advantages are derived from the manner in which steps conducted in the slagging combustor 105 are used to enhance operations in the reactor 120. Also, advantages are derived from utilization of the specific, unique mechanical arrangement presented hereinbelow.

1. Operations in the Slagging Combustor

In the slagging combustor operation, the coal fuel is converted to a hot raw coal gas, and liquid slag is formed. In general, this is conducted by controlled multistage combustion or heating, to achieve raw coal gas at a preferred temperature of at least 2200° F., and more preferably at least about 2600° F. Preferably, the operation is conducted under conditions appropriate to form off gases at pressures of at least 2 atm, more preferably at least 5 atm, and most preferably about 6–30 atm. Herein when it is indicated that the raw coal gas is provided at a particular pressure, it is meant that the total pressure of the off gases from the slagging combustor are at the pressure, partial pressures from air or components in air versus components from combustion being ignored. Means for providing appropriate pressure generally include the air compressor which provides combustion air to the slagging combustor.

It is noted that conventional slagging combustors can be adapted for use in processes and arrangements according to the present invention. Such slagging combustors are advanced compact burners, designed for rapid combustion of coal and formation of coal ash in the form of liquid slag. An example of such an arrangement is provided by U.S. Pat. No. 4,685,404, incorporated herein by reference.

For a typical slagging combustion step of a process according to the present invention a staged slagging combustion is conducted. Initially pulverized coal, dry or as a slurry, is fed into the first stage of the combustor with a stoichiometric ratio (R) of less than 1.0 and preferably approximately equal to 0.4; that is, with only about 40% of the theoretical amount of air necessary to provide complete combustion. The interaction of combustion air with the coal particles under high turbulence and low R (about 0.4) creates conditions for rapid combustion, at temperatures exceeding 3,000° F., and high combustion efficiency. Heat release is very high, close to 1 million btu per hour CUFT. Because of rapid combustion with deficient use of combustion air (i.e. no excess air), formation of $NO_x$ is inhibited.

In the slagging combustor portion of the process, if a conventional staged slagging combustor (adapted for pressurized processes) is used, there is a second stage of combusting, which is typically undertaken at a slightly higher stoichiometric ratio (still <1.0 and preferably about 0.6, i.e., a sufficiency of combustion air such that only about 60% of air for the complete reduction is present). In this stage, the temperature of the off gases is reduced, preferably to no less than about 2200° F., and more preferably to no less than about 2600° F. During or immediately after this second stage of the slagging combustion, at least about 90% and more preferably about 95% of the ash is rejected in liquid form. That is, the great majority of the liquid slag is separated from the raw coal gas.

After removal of the slag, several operations are available. Combustion can be completed, before the gases are transferred to the reactor 120, by mixing of the hot combustible gases with additional air, for example under a stoichiometric ratio of >1.0, preferably about 1.15; or, the hot gases, still including a combustible component, can be directly introduced into the next stage of the process, i.e. reactor 120. The decision of whether or not to have the gases in the reactor 120 be combustible will in part depend upon choices made with respect to optional processes conducted downstream, as explained further below.

In general, again, it is desired to remove at least about 90% of the slag, and preferably at least about 95% of the slag, during the slagging combustion and prior to introduction of the hot gases into the reactor 120. This is generally efficiently achieved by providing a slagging combustion system with a liquid drop-out or exit upstream of the gas exit.

Undesirable product gases, for example $SO_2$ from the sulfur content of coal, are formed in the slagging process. Any treatment of the gases, to reduce $SO_2$ content, through addition of chemicals such as sorbents during the slagging combustion, is to be avoided. Sorbents, with the products of $SO_2$ absorption associated therewith, would generate as a waste product a leachable slag, if they were used during slagging combustion. By the term "leachable slag" and variants thereof, it is meant that the slag is not stable, but rather contains chemical contaminants that can be leached therefrom, for example by groundwater. Since the slag from such treatment would be leachable, it would require special handling and disposal.

If, on the other hand, slagging combustion processes according to the present invention are conducted with essentially no $SO_2$ control, that is, without treatment with chemicals (so as to provide adsorbents or the like in a liquid slag removed from the slagging operation), the material removed from the slagging operation is essentially nonleachable and stable. This material may be readily disposed of, or utilized in various materials such as cement, asphalt, fillers, etc. It is an advantage of processes conducted according to the present invention that the great majority, at least 90% and more preferably at least about 95%, of ash generated by the coal utilized in the slagging combustor can be provided in a stable, nonleachable state for later disposal or use; while, at the same time, later problems with sulfur dioxide emissions from the plant are inhibited. Specific methods by which sulfur dioxide control is ultimately obtained will be described later. In general, the sulfur dioxide control is achieved in the downstream reactor 120, and not in the slagging combustor 105. That is, $SO_2$ control is not addressed until after the liquid slag is removed.

Conventional slagging combustors are generally operated at about atmospheric pressure. In processes according to the present invention, the slagging combustors should be operated under pressures of at least about 2 atmospheres, more preferably at least 5 atm and most preferably at about 6-30 atmospheres. The initial gas pressure to the slagging combustor 105 is provided, at least in part, by means of an air compressor arrangement, for example compressor 110, FIG. 4, located upstream of the slagging combustor 105. Compressor 110 provides compressed air to the combustor 105 as a source of oxygen for combustion.

2. The Reactor Arrangement

In the reactor 120, FIG. 4, a number of processes are selectively conducted. First, a substantial portion of any remaining small amounts of slag in the off gases from the slagging combustor 105 is removed. Secondly, the gases are treated for control of undesirable chemicals therein; for example, $SO_2$ and if desired $NO_x$ control and/or control of other components. Also, in the reactor if the off gases from the slagging combustor are not completely reduced, and it is desired that they be completely reduced, the gases can selectively be mixed with air to generate further reduction. Other manners in which the reactor can be utilized to advantage will be understood from details given below with respect to modified applications.

The preferred reactor 120 is a pressure vessel, designed for operation at pressures of at least about 2-25 atmospheres, and preferably pressures of at least about 6-30 atmospheres, with operating temperatures of at least approximately 2200°-3000° F. Preferably, the reactor 120 is constructed as a gas/particle separator so that sorbent material used therein and any small amount of slag carried into the reactor 120 with gas flow from the slagging combustor operation can be readily separated therein from the gases. Also, some separation of carbon particulates from the hot gases can be achieved within the reactor 120. This can be accomplished, for example, through utilization of a cyclonic separator-type design for the interior of the reactor, providing for low upward velocities of gases passing therethrough.

Within the reactor 120 sorbents are added to achieve chemical modification of the gases. In particular, preferably sorbents are added to absorb sulfur dioxide within the gases, achieving sulfur dioxide reduction of at least about 60%, and preferably to at least 98%, relative to $SO_2$ in the off gases from the slagging combustors. The sorbents may be added as particulates or slurry, depending upon the particular application. Means facilitating mixing of the sorbent(s) and gas include the means for introduction of the gases to the reactor in a helical pattern.

Since the great majority of the slag will have been removed prior to entry of the gases to the reactor, several advantages result. First, the solids drop out from the reactor will generally comprise the sorbent material, with only small amounts of slag and coal particulates therein. Contamination of the bulk of the slag material (removed before the gases entered the reactor 120) by the spent sorbent will have been avoided.

Also, since the solids removed from the reactor will substantially comprise sorbent, with relatively little slag therein, the sorbent may be recycled and utilized more efficiently. This facilitates utilization of more advanced and potentially expensive sorbents.

Since the processes which take place in the reactor are conducted under pressure, advantage may be taken of the hot pressurized conditions to facilitate reactions of the gases with the sorbent. Again, this generally enhances sorbent activity, and helps render the utilization of more complicated or advanced sorbents more cost effective.

In general, two primary parameters (in addition to temperature and pressure) are important to achievement of desired cleaning processes in the reactor (besides good mixing). These are rate of gas flow in the reactor and retention time in the reactor. The longer the retention time, the greater will be cleaning through absorption. The slower the gas flow, the greater will be solids drop-out, including sorbent drop-out. Preferably, the reactor is designed with a volume and other dimensions, relative to incoming and exiting ducts, sufficient to allow for flow at about 1-3 meters/sec. therein, with a total residence time of at least 15-45 seconds.

Other materials may be added to the system in the reactor to facilitate either treatment of the gases or downstream operations. For example, water and/or air may be added to advantage. Reasons why such additions may be desirable are provided in further descriptions below. Also, sorbent materials or other materials for reacting with, neutralizing or absorbing other undesirable components in the gases, such as any alkali vapor component, may be applied in the reactor 120.

Figure 5:
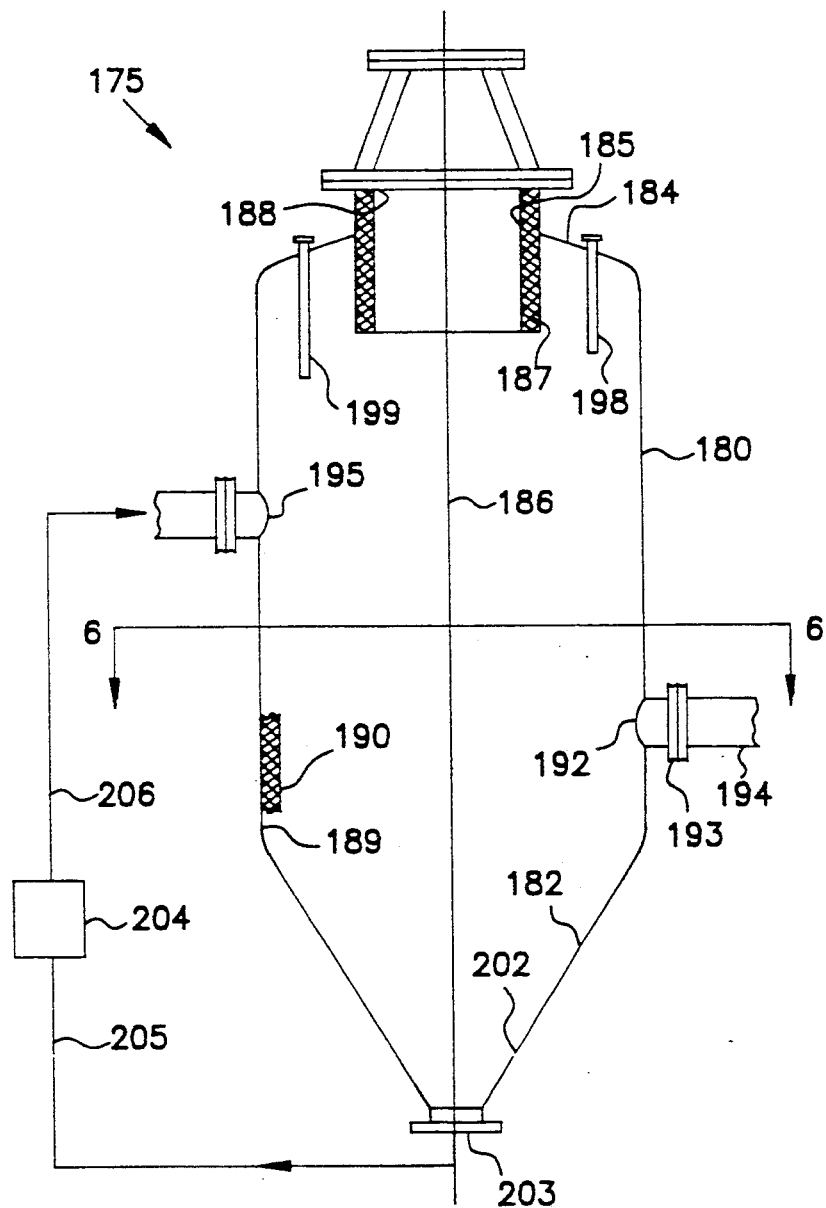

In FIG. 5, a preferred reactor arrangement design for use in processes and arrangements according to the present invention (including those processes as described with respect to FIG. 4) is illustrated. In FIG. 5, the reactor arrangement or reactor is generally designated at reference numeral 175. The reactor 175 includes a large pressure vessel or reaction chamber 180 oriented substantially vertically with a tapered, lower solids collection area 182 and an upper region 184 having a gas exit arrangement 185 therein. Preferably and advantageously, the reactor 175 is a one-chamber vessel substantially free of internal structural components such as partitions. Except for injector equipment as described, internal elements are avoided so that problems with failure under the extreme reaction conditions provided therein are inhibited and/or avoided. When it is indicated that the vessel 180 is oriented "substantially vertically", it is meant that the vessel 180, which has a generally circular horizontal cross-section, defines a central longitudinal axis 186 which extends generally vertically. By this characterization it is not meant to be implied that the horizontal cross-section is constant regardless of the vertical point at which it is taken; for example the arrangement 175 of FIG. 5 includes tapering lower region 182. The circular cross-section of reactor 175 facilitates mixing of the sorbent material with the gases, when the gases are directed into the reactor in a manner off-set from the central axis, in a helical pattern about the axis. Preferably exit arrangement 185, in upper region 184, includes a collar arrangement 187 projecting slightly into reactor 180, around exit port 188, to facilitate particle separation.

Still referring to FIG. 5, pressure vessel 180 defines an internal wall 189 having refractory lining 190. An input port for gases from the slagging combustor is generally designated at 192, including manifold 193. The manifold 193 is adapted for connection to a gas line 194 from an upstream slagging combustor. Preferably, port 192 is oriented in a lower half or lower portion of reactor 175; and, is oriented to direct gas flow in a generally helical pattern within the vessel 180 (i.e. in a circular path about central axis 186) to facilitate sorbent mixture, solids separation, and, to enhance residence time of gases within the reactor 175. Also, preferably the direction of gas inflow is such as to not be directed immediately against any internal structural component of the reactor 180, since when the gases enter reactor 180 via port 192 they are typically at their hottest and most reactive. Preferably the latter is achieved by providing reactor 175 with no substantial internally projecting components in the bottom half or region.

Preferably the direction of gas input through port 192 is horizontal or slightly downward, to enhance retention time of gases within reactor 175. This will facilitate sorbent mixing and separation.

Referring again to FIG. 5, reactor 175 includes an inlet port arrangement 195 providing means for introduction of sorbent material. Preferably, inlet port arrangement 195 is oriented to provide sorbent introduction at a location above a level of slagging combustor gas entry, i.e., port 192 in FIG. 5. This will generally facilitate mixing of sorbent with the gases.

Still referring to FIG. 5, reactor 175 includes injectors 198 and 199 therein. Injectors 198 and 199 comprise means adapted for selective injection of materials such as water and/or air into reactor 175. Reasons for such water or air entry will be described below. Preferably, injectors 198 and 199 are located in an uppermost region 184 of reactor 175, well out of the path of direct flow of gases into the reactor 175 from the slagging combustor, through port 192; and, preferably well above and out of the path of direct flow of sorbent material into the reactor 175, through port 195. In this manner, injector operation will be facilitated and injector lifetime of operation will be facilitated.

General operation of reactor 175 will be understood by reference to FIG. 5. Combustion gases from the slagging combustor enter the reactor through port 192. They are directed in a helical pattern within the reactor 175, around axis 186. This will be further understood by reference to FIG. 6, a cross-sectional view of reactor 175. In FIG. 6, gas path from the slagging combustor is generally indicated at line 200.

Any small amounts of liquid slag not removed upstream of the reactor 175 will tend to "drop out" or be separated from the gases within reactor 175, to migrate downwardly along tapered wall 182 to collection point 202. Materials collected at 202 are removed from reactor 175 through bottom outlet 203. Means for recycling sorbent are shown at 204, using lines 205 and 206.

The swirling gases within reactor 175 are treated with sorbent, introduced via port 195. Preferably, the sorbent treatment is conducted to at least remove sulfur dioxide within the gases. The swirling, circular, motion of the gases facilitates mixing with the sorbent, for efficient cleaning. The sorbent, and any other particulate materials added in reactor 175, will tend to drop out, to collection area 202, before the gases pass out of port 188. Specific details regarding sorbent addition are provided in further descriptions. Before the gases escape through gas exit arrangement 185, water and/or air may be injected therein by injectors 198 and 199. Herein when it is said that water and/or air is injected "during the step of mixing and separation", it is meant to include within the term such injections which take place in the upper portion of a reactor wherein mixing and separation primarily occur in a lower portion.

In certain applications, it may be desirable to input gases from more than one slagging combustor into a single reactor to facilitate operation. Such an arrangement is illustrated in FIGS. 7 and 8. There, reactor 210 includes three gas input arrangements 211, 212 and 213 from slagging combustors. (Item 213 is not visible in FIG. 7). An inlet arrangement 215 for sorbent is also shown. Arrangement 210 also includes a plurality of injectors 216, for air or water.

In alternate applications, off gas flow from a single slagging combustor may be directed to a plurality of reactors oriented parallel to one another. In this manner smaller reactors can be used to handle a given volume of gases from slagging combustion.

Sorbent Use and Optional Recirculation

As previously explained, in the reactor sorbent material is utilized to conduct control of materials such as sulfur dioxide. The conditions are high temperature and greater than atmospheric pressure, with only relatively minor amounts of slag present. The present process takes advantage of these conditions in at least the following ways: high pressure facilitates absorption of gases such as sulfur dioxide onto the sorbents; high temperature facilitates reaction at the sorbent surface; low slag presence means that the sorbent can be collected and selectively recirculated, recycled or more readily disposed of; and, avoidance of the use of sorbents until after the bulk of the slag material has been removed facilitates generation of most of the slag (from the combustor) in a form which is not leachable, and is thus readily handled.

The present process enhances the use of conventional $SO_2$ sorbents such as lime or limestone. Conventionally, limestone has been utilized as a sorbent in flue gas scrubbing systems, and in fluidized bed arrangements. Typically, uses in flue gas scrubbing systems generally involve introduction of the sorbent, as a slurry, into the flue gas through utilization of an atomizer. Since typical flue gas temperatures are only about 300°-400° F., and since good mixing is required to achieve substantial absorption, a step of atomizing the limestone slurry has generally been required. Such a step is avoided herein, because intimate mixing will occur in the circular reactor under the extreme, turbulent, conditions therein. Some conventional uses of sorbents are described in U.S. Pat. Nos.: 4,572,085; 4,598,652; and, 4,599,955, the disclosures of which are incorporated herein by reference.

In conventional fluidized bed arrangements, generally shredded limestone has been utilized in a particle size of about ¼ to ½ inch. Smaller sizes can be accommodated in processes according to the present invention, to advantage.

In the present application, i.e., utilization in reactors of the types illustrated in FIGS. 5-8, an advantage in sorbent use are presented. First, again, the high temperatures and circular gas flows within the reactor vessel facilitate intimate mixing and substantial retention time with the sorbent. Thus, the slurry/atomizer-type introduction is not necessary, and is avoided to advantage. Also, relatively small particle sizes, and thus enhanced surface area for absorption, may be utilized since the helical flow pattern in the reactor itself facilitates particle separation within the reactor. Further, the overall process is such as to enhance operation of hot gas cleanup in a following step, should any particles remain entrained within the gases. In general, it is foreseen that, if utilized in a slurry, the sorbent can be injected directly into the reactor without the need of an atomizer system; and, if utilized in a dry particulate form, preferred particle sizes, for example on the order of about 0.1 mm to 2.0 mm (preferably about 0.5-1.0 mm) can be effectively used.

It is noted that the utilization of limestone sorbents is generally associated with carbon dioxide formation. Since carbon dioxide is a greenhouse gas, it is preferable to inhibit its formation, at least to the extent reasonable. It is noted that carbon dioxide comprises a major component of combustion gases anyway, so by no means can its generation be stopped. However, it would be desirable to avoid its further generation by means of the sorbent, if possible.

Metal-based sorbents are known. More specifically, iron compounds, copper compounds and zinc-ferrite compounds are known to absorb sulfur components in hot gases, and to function in such a capacity without carbon dioxide generation. Such compounds have not found wide use as sorbents in hot gas purifications, however, at least because they are relatively expensive, and unless very efficiently utilized, are not cost effective. They also must be used within certain controlled temperature ranges (about 2000° to 2600° F.) if they are to be effective, which in the past has been impractical. Further, they would present slag leaching (and thus, environmental) problems, if they were used in a conventional coal burning process.

Processes and arrangements conducted according to the principles of the present invention, however, facilitate use of more exotic (for example metal-based) sorbents such as iron, copper an/or zinc-ferrite compounds. With respect to temperature, the extreme conditions within the reactor are generally above the melting points for such metal-based sorbents (about 2000°-2600° F.), and thus they can be used in their most active state. Secondly, the extreme, turbulent conditions within the reactor facilitate dispersion of sorbent materials, and thus efficiency in use. Also, since the solids collected within the reactor contain relatively little slag, the sorbents can be recycled until substantially spent, facilitating cost effectiveness. In FIG. 5, means for optionally recycling sorbent through line 217 are shown at 218. Further, disposal presents relatively little problem, since in the end they would be mixed with relatively little slag. In fact, the sorbents can in some instances be regenerated, if desired. Also, the relatively high pressure conditions facilitate operation of sorbent, and thus enhance cost effectiveness. In general, processes according to the present invention provide a cost effective manner in which iron, copper and zinc-ferrite sorbents, known to be good for $SO_2$ absorption in theory, but not practical and not cost effective in many previous processes, can be used to advantage.

For similar reasons as those described above with respect to iron sorbents, processes according to the present invention are well adapted for use with other sorbents, including relatively expensive, exotic sorbents, for conducting a variety of effective hot gas treatments, including treatments for alkali vapors, $SO_2$ removal, etc. Again, these features include: high temperature; pressures of at least 2-30 atm; good mixing; ability to recycle sorbent until spent; good sorbent dispersion without the need for an atomizer; particulate separation within the reactor; and, avoidance of a waste product from the reactor including large volumes of slag.

Referring again to FIG. 5, it will now be understood that, as a result of effective sulfur dioxide removal in reactor 120, gases in line 123 are provided substantially free of problem levels of sulfur dioxide. Thus, downstream scrubbing operations to inhibit sulfur release to the atmosphere are generally unnecessary. Further, damage to downstream equipment from acid formation involving sulfur dioxide is inhibited to advantage. General advantages resulting from this have previously been described. Specific advantages will be discussed in further detail below, when individual steps are considered.

Water Injection into the Reactor

Direct water (or steam) injection into reactor 120, FIG. 4, may be utilized to advantage. For example, water may be introduced to control $NO_x$ formation. Further, the water may be utilized to increase the mass of gaseous material transferred to the gas turbine 135, and thus will facilitate energy generation. Also, water injection in reactor 120 will generally reduce $NO_x$ formation. Finally, water injection may be utilized to control the temperature of gases leaving reactor 120 through line 123. In general, it may be desired to reduce the gases leaving reactor 120 through line 123, to a temperature of no greater than about 1700°-1900° F. to facilitate hot gas cleanup at arrangement 125. Herein, the term "water" when used to refer to injection into the reactor 120, or into the flue gases elsewhere in the system, is meant to include within its definition steam. The same is true when the reference is to cooling fluids.

Referring to FIGS. 5 and 6, for preferred reactors such as reactor 175, water injection may optionally be accomplished in either or both of two manners: first, it may be introduced with the sorbent through input port 195, for example, to carry the sorbent in a slurry; or, water may be injected through one or more of the injectors 198 and 199. Preferably water for cooling and mass increase is introduced in the upper region 184 of the reactor 175, for example by injectors 198 and 199.

Preferably, cooling water injected into the reactor 120 is transferred therein at approximately 0.5-10.0 atmosphere higher pressure than the pressure in the reactor 120. As suggested above, increased power output will result due to increased mass of fluid (original mass of hot gas plus mass of injected water) expanding in the gas turbine 135, FIG. 4. For instance, direct cooling of the hot gases from 2600°-1800° F. (by converting water into saturated steam and utilizing its enthalpy in the range of 1,000 to 1,300BTU/lb; enthalpy being dependent on pressure and inlet water temperature) will generally increase the mass of the gas by 15-20%, which results in increased power capacity in approximately the same ratio. In addition, the injected water will have reduced $NO_x$ emission levels.

It is noted that one disadvantage to substantial water or steam injection is that at the end of the process moisture carried by the gases may be emitted to the atmosphere. In conventional systems, such water could not be readily recovered, since the gases generally had to be maintained at a temperature of at least about 300° F., from exiting the heat recovery boiler until release through the stacks to the atmosphere. In the present arrangement, however, since sorbents are utilized in the reactor to reduce sulfur dioxide presence, the off gases from the reactor do not include substantial amounts of sulfur dioxide, and thus the gases can be cooled, for example in the heat recovery boiler, to a greater extent, with a follow-up condensation of much of the injected moisture, if desired. This is also facilitated by the upstream particulate removal. Thus, the moisture, to a great extent, can be recaptured before the gases are released to the atmosphere. This is advantageous, since it to some extent reduces or minimizes water use, and also tends to inhibit or minimize undesired vapor cloud formation.

Direct Injection of Air into the Reactor

Air (or, if it is desired to keep the oxygen content in the coal gases down, a non-reactive gas such as nitrogen) may selectively be injected into the reactor. For the preferred reactor arrangement shown in FIG. 5, generally three possible means of air introduction are provided: air injection along with combustion gases introduced through port 192; air injection along with sorbent introduced through arrangement 195; and, air injection through one or more of the injectors 198 and 199. Preferred introduction of cooling air is through one or more of the injectors 198 and 199, i.e. in the upper portion 184 of the reactor 175.

Air (or nitrogen) may be selectively introduced into the reactor to advantage for a number of reasons. First, the air may be utilized to cool the reaction gases and increase their mass. Since an increase in mass provides a greater mass of pressurized gas to the downstream gas turbine, greater power generation results. It is foreseen that direct cooling by air can be readily used to result in an increased power capacity by 20-40%, due to increased mass of working gas.

Another positive effect from the introduction of clean cooling air into reactor 120, FIG. 3, is that the air has a diluting effect, which reduces emission levels of any pollutants in the coal gas. The dilution effect may be considerable, since the mixed gas may, for example, include about 30-45% clean air. This will also have a tendency to reduce or eliminate stack plume; since the cooling air mixed into the reactor may be provided with a low, or relatively low, moisture content.

Advantages may be obtained from the introduction of both air and water into the reactor. Each would provide at least the general advantages indicated above.

Hot Gas Cleanup

As indicated with respect to the description of FIG. 3, off gases from the reactor 120 are generally subjected to a hot gas cleanup before they are introduced into the gas turbine for power generation. This is desired to protect downstream equipment, especially the gas turbine, from any fine particulates still carried by the reactor off gases; and, to inhibit ultimate release of fine particulates to the atmosphere, when the gases are vented.

A variety of mechanical arrangements may be utilized as means to achieve the hot gas cleanup, including multicyclone arrangements and labyrinthine or serpentine filtration devices (i.e. impact separators). In general, to remove particulates to a most desired extent with present technology, at least a filtration device may also be required. This is facilitated since most of the slag, which could otherwise interfere with the operation of the filtration device, was removed upstream of the reactor 120, with any small amounts of remaining slag essentially completely removed in the reactor 120 itself. In FIG. 9, an impact separator cleanup arrangement 219 is shown in schematic, wherein particulate drop out occurs as the gases flow through the maze from inlet 220 to outlet 221. In FIG. 10, a filter arrangement 222 is illustrated in a schematic, for cleaning gases moving from inlet 223 to outlet 224, upon passage through filter element 225. In FIG. 11, a cyclone separator 226 is shown, for cleaning gases moving from inlet 227 to outlet 228, with solids drop-out at 229. Thus, the hot gas cleanup may include: cyclonic separation; impact separation and/or filtration.

With conventional equipment, generally the hot gas cleanup operation will require gas temperatures no higher than within the range of about 1,800°–1,900° F. Since the hot gases from the slagging combustor are generally substantially higher than this, cooling, either in the reactor or the line prior to entering into the hot gas cleanup arrangement, will be necessary. Two methods applicable to cooling gases within the reactor, i.e., direct water or air injection, have already been discussed. Indirect cooling methods including utilization of heat exchange arrangements, may also be applied within the reactor. Specific embodiments illustrating this are provided in greater detail hereinbelow.

The Gas Turbine Power Generation Arrangement

Because of some recent interest in combined cycle power generation, gas turbine technology has been advancing. Present indications are that gas turbines are being developed that work with inlet temperatures close to about 1,800°–1,900° F., without a booster burner. Exhaust temperatures (i.e. gas flow out from the turbine) will be in the range of 850°–950° F. (450°–510° C.), with a pressure ratio in the range of 6-25; i.e., a drop from 6-25 atmospheres to about atmospheric pressure. Specific power output would be in the range of 130 to 150 kw/lb/sec.

For more advanced turbines, also being developed, the temperature of the hot inlet gas to the turbine can be elevated by a booster burner to about 2000°–2300° F., or more. Such turbines will have 6-35 compression ratio, exhaust gas temperatures in the range of about 950°–1000° F., and greater specific power output, generally at least about 150 kw/lb/sec. of exhaust gas. However, such advanced turbines, when fully developed, will likely be relatively sensitive to impurities in the inlet gas, thus exhibiting a higher demand for upstream purification processes if gases other than combustion gases from natural gas are utilized. The present invention can accommodate such demands.

Information provided in some of the following descriptions concerning modified schematics and operations will indicate the versatility of the processes according to the present invention, with respect to the accommodation of various types of gas turbines. In general, many advantages are derived from the fact that the upstream reactor may be utilized to control chemical compositions of the coal gas, and means are provided for efficiently cleaning the gases of particulates suspended therein. Thus, advanced gas turbines, even those with relatively high sensitivities to hot abrasive gases or particulates, can be efficiently used with coal gas, in processes according to the present invention.

The Heat Recovery Boiler/Steam Turbine Power Generation Arrangement

1. The Heat Recovery Boiler

The heat recovery boiler may be of a conventional type. However, even if the heat recovery boiler is more or less a conventional arrangement, advantages in its operation will result from utilization of processes according to the present invention. As indicated previously, through enabling efficient utilization of sorbent materials in the combustion gases, the processes of the present invention facilitate sulfur dioxide removal upstream of the heat recovery boiler. This means that as gases cool in the heat recovery boiler, damage from moisture/sulfur acid precipitation on the heat transfer surfaces is less likely, enhancing lifetime of the heat recovery boiler. Also, buildups from particulates and/or corrosion are less likely, thus enhancing the heat transfer process. A result is that a greater amount of heat can be removed from the off gases in the heat recovery boiler, in less time, over a lifetime of operation for the heat recovery boiler. It is foreseen that, with processes according to the present invention, gases passing through the heat recovery boiler may be cooled therein to temperatures well below 300° F., for example to temperatures at or below about 250° F. and more preferably no higher than 180° F. (most preferably 160°–180° F.), an amount of heat transfer not practical in conventional heat recovery boilers utilized in operation with coal gases, due to sulfur dioxide content of the gases. This amount of heat transfer will boost the productivity of the heat recovery boiler significantly. Thus, even if a conventional heat recovery boiler is used, it may be provided with means for reducing the temperature of gases flowing therethrough to below 250° F., preferably to about 160°–180° F.

2. The Steam Turbine with Accessories

With full condensation the conventional steam turbine provides approximately 25–40% of the generating capacity of the combined cycle. Any of a variety of conventional steam turbines may be used.

Some Modified Applications of the Basic Coal-Based Combined Cycle Arrangement Described in FIG. 4

The versatility of coal-based combined cycle processes performed according to the present invention is demonstrated by various applications presented herein, and described with respect to FIGS. 12-19. The descriptions presented in this section indicate various modifications to the basic schematic of FIG. 4, utilizable to provide certain selected advantages or to accommodate certain specific process situations or limitations. For each variation, equipment used may be generally as described above. For example, reactor 175, FIG. 5, may be used in any of the processes described, if appropriately modified to accommodate specific features discussed. The slagging combustor of each system may be analogous to combustor 105, FIG. 4.

1. Direct Cooling of Hot Gases in the Reactor by Water (Steam)

Figure 12:
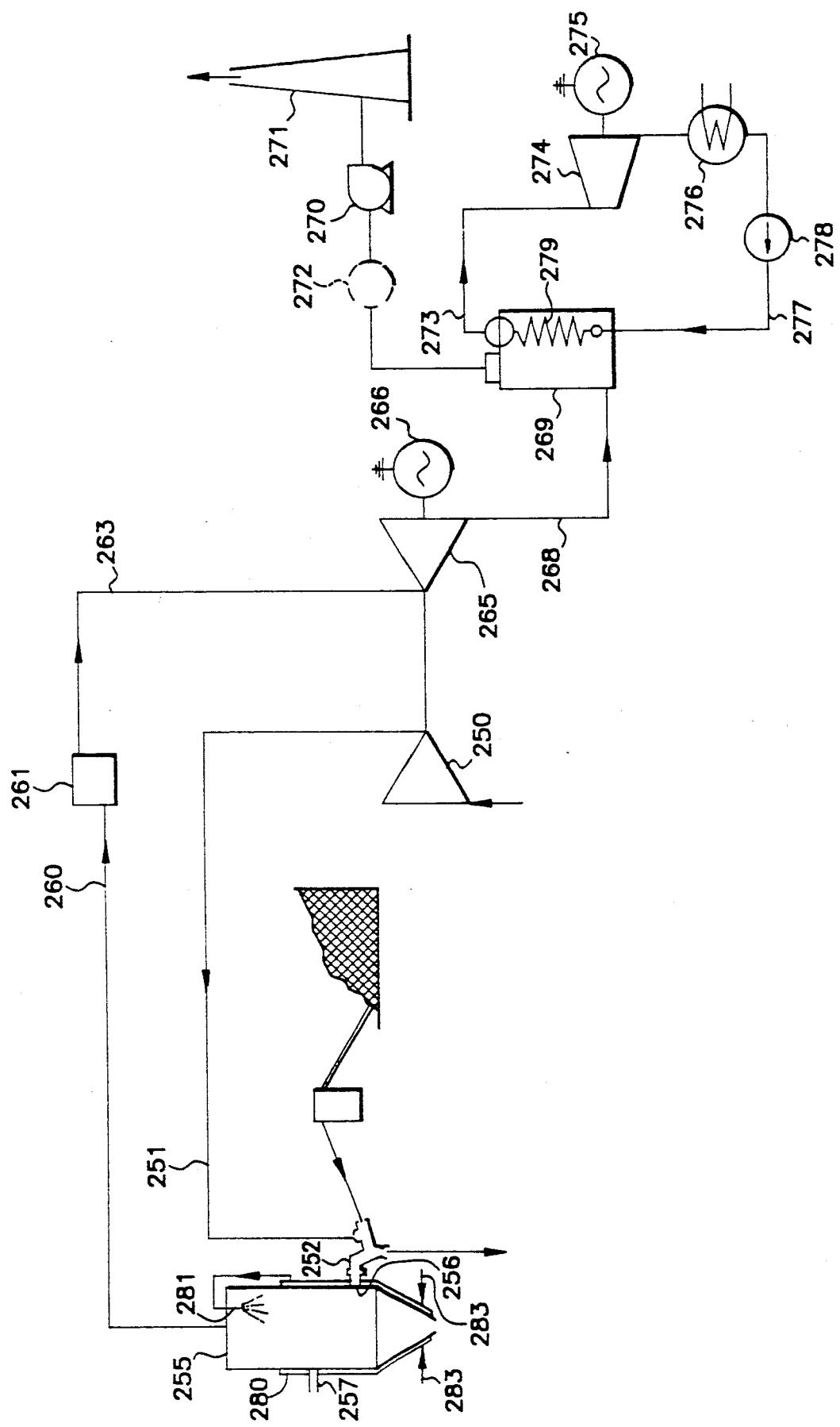

In descriptions presented above, advantages obtainable from injecting cooling water into the reactor were presented. In FIG. 12, a specific modified version of the FIG. 4 schematic is shown, illustrating an advantageous way of providing for the cooling water. In FIG. 12, air (compressed in compressor 250) is fed via line 251 to slagging combustor 252. Off gases from the slagging combustor 252 are fed into reactor 255, at 256. Reactor 255 also includes an injection arrangement 257 for introduction of sorbent material. Off gases from reactor 255 are shown directed via line 260 to a hot gas cleanup arrangement 261. The hot gases from arrangement 261 are directed via line 263 to gas turbine 265 for first cycle power generation at generator 266. The off gases from the gas turbine 265 are directed via line 268 through heat recovery boiler 269, and outwardly through fan 270 and stack arrangement 271 (a condenser 272 may optionally be used for the off gases). Steam generated in the heat recovery boiler 269 is shown transferred via line 273 through steam turbine 274 for power generation at generator 275. Expanded steam/water from turbine 274 is transferred through final condenser 276 before recycling via line 277, through pump 278 through heat exchanger 279. In all manners thus far described, the arrangement of FIG. 12 may be analogous to that of FIG. 4, and the equipment and materials utilized may be as described above.

A manner in which the scheme of FIG. 12 differs from FIG. 4 is in the nature of cooling water injection into the reactor 255. In particular, the reactor 255 of FIG. 12 is provided with cooling means or arrangement, involving a water jacket-type heat exchanger system 280. Through utilization of this exchanger, the reactor walls are protected from heat damage. The heat derived from the reactor walls (in heating water jacket cooling arrangement 280) is used to advantage. In particular, it is heated water from the jacket 280 that is injected into reactor 255 through injector 281, in an upper portion of reactor 255. That is, waste heat from the reactor 255 is utilized to preheat water prior to the injection of that water into the reactor. Although heated, the water will still have an appropriate cooling effect. This facilitates reactor control. Cooling water input to the jacket arrangement 280 is shown at 283.

2. Arrangement Involving Direct Cooling of Hot Gases in a Reactor by Air

As has previously been indicated, in certain applications it will be desirable to cool gases in the reactor by direct injection of cooling air. Advantages from this include the fact that the mass of the gases will have been increased considerably, resulting in greater power generation at the gas turbine. Also, preferred (for some applications) dilution will have occurred. A schematic illustrating a preferred arrangement for accomplishing this is presented by FIG. 13.

Figure 13:
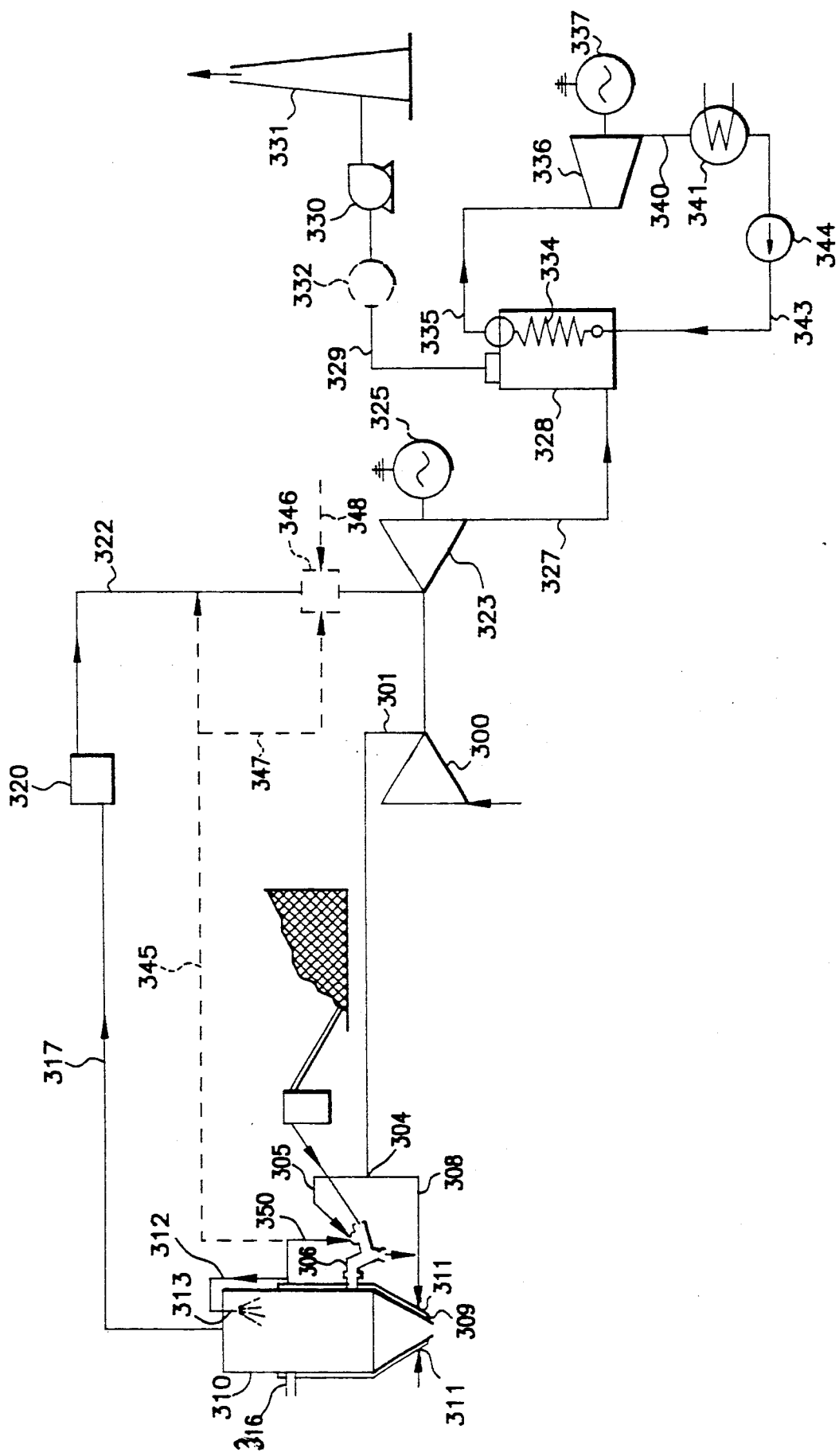

Referring to FIG. 13, air is initially compressed in compressor 300. The compressed air is transferred therefrom via line 301. Line 301 is split at junction 304 into a first line 305, which directs the air into slagging combustor 306 for the combustion operation; and, a second line 308.

The compressed air in line 308 is directed into air jacket arrangement 309, around reactor 310. By means of the air jacket 309, compressed air from line 308 is heated through heat exchange with the walls of the reactor 310. The hot air is then directed outwardly from the jacket via line 312, for selective injection into the reactor at 313. The air, although hot, will still have a cooling effect when injected into reactor 310, since the temperatures in the reactor 310 will be high relative to the air.

Other portions of FIG. 13 may be as previously described with respect to FIG. 4, namely, the reactor 310 is provided with a sorbent feed line at 316. Gas flow out from reactor 310 is indicated at line 317, being directed to hot gas cleanup arrangement 320. Gases from hot gas cleanup arrangement 320 are shown directed via line 322 to gas turbine arrangement 323 for power generation at generator 325. Off gases from gas turbine arrangement 323, at about atmospheric pressure, are shown drawn off at line 327 for direction into heat recovery boiler 328. The gases, cooled in heat recovery boiler 328, are directed via line 329 through fan 330 to stack 331. An optional condenser 332 may be used in line 329 if desired.

Steam generated in heat recovery boiler 328 via heat exchanger 334 is shown directed via line 335 to steam turbine 336 for power generation at generator 337. The expanded steam/water is shown in line 340 directed into condenser 341, before recycling via line 343 and pump 344.

In some applications, it may be desirable to introduce air to the combustion gases, downstream of hot gas cleanup. One reason for doing this, is to increase the mass of the hot gases before they flow into the gas turbine arrangements 323. A reason why it may be preferred to introduce the air to increase mass downstream of hot gas cleanup, is so that the concentration of particulates in the gases does not decrease, by dilution, prior to hot gas cleanup. That is, air introduction (when done at all) downstream of hot gas cleanup will result in: a dilution effect with respect to the concentration of particulates that pass through hot gas cleanup; and, increased efficiency of the hot gas cleanup process. In certain preferred applications it will be desirable to have the air introduced downstream of hot gas cleanup be preheated air, to facilitate temperature control and to limit further cooling of the gases downstream of hot gas cleanup. The preheated air may, for example, be air heated from air jacket 309, at reactor 310. In FIG. 10, an optional line 345 directing this air to the gas line 322 downstream of hot gas cleanup 320, but upstream of gas turbine arrangement 323 is shown.

In some applications, it may be desirable to provide for combustible gases in line 317, coming outwardly from reactor 315; that is, to conduct the process of combustion of the gases in the combustor 306 and the reactor 310 only partially, leaving some burnable or oxidizable hydrocarbons or carbon monoxide in the gases. If this is done, then it may also be desirable to more completely combust the gases, i.e., heat the gases further prior to power generation in gas turbine arrangement 323. This would preferably be done by means of a burner located upstream of the gas turbine arrangement 323, and downstream of hot gas cleanup 320. It may also be desirable to direct air to that burner to facilitate the burning operation. Referring to FIG. 13, such an optional booster burner is indicated at reference numeral 346, with preheated air directed thereto from jacket 309 via spur line 347. Thus, the air (for combustion of the booster burner) may be directed into gas line 322, as discussed in the previous paragraphs, or it may be introduced at burner 345.

If the introduction of air into gas line 322, i.e. into the combustion gases downstream from hot gas cleanup 320, results in substantial drops in temperature to those gases, then in order to achieve efficiency from the gas turbine arrangements 323, it may be required to utilize the booster burner 345 to increase the temperature of the gases. If the gases themselves do not include a sufficient combustible component to achieve this, then auxiliary fuel (such as natural gas or distillates) may be provided to the booster burner 345 as shown at 348.

Preheated compressed air, i.e., heated by means of the jacket 309 surrounding reactor 310, may also be utilized in the slagging operation. That is, the gas lines can be configured to direct some or all of the heated air from jacket 309 into the slagging combustor 306. In FIG. 13, such an optional line is illustrated at reference numeral 350.

3. Utilization of Booster Burner

In order to increase efficiency, modern gas turbines will be designed for inlet gas temperatures in excess of about 2000° F. Since lower gas temperatures (typically on the order of about 1700°–1900° F.) are preferred for the hot gas cleanup, it will sometimes be desirable to heat the gases somewhat (to at least 2000° F.) before they are transferred into the gas turbine. A method of accomplishing the heat increase is to provide a booster burner downstream of the hot gas cleanup arrangement, but upstream of the turbine, in which the off gases from the cleanup are heated. Two general methodologies comprise: utilization of off gases that are not completely combusted as fuel for the booster burners; or utilization of auxiliary fuels such as natural gas, distillates or synthetic fuels derived from coal or biomass, in the booster burner.

When noncombustible gases are produced in the reactor, the booster burner uses auxiliary fuels. Depending on the type and size of gas turbine, approximately 8–21% of the total thermal input can be delivered from the auxiliary fuel and about 79–92% from the coal gas i.e., off gases from the reactor. Total electric output could be increased about approximately 5–40% in comparison to previous arrangements, with the combined thermal efficiency cycle being in the range of about 46–49%.

In conventional systems, in order to reduce $NO_x$ emission levels from the stack of coal-burning power plants, cofiring with natural gas has sometimes been suggested. If 15–22% of the total thermal input was delivered from natural gas, environmental standards, in the past, have been satisfied. Under such circumstances, the natural gas was used primarily for environmental control, and its energy content was only utilized by about 30–35%. In the present application, the natural gas (for the booster burner) would actually increase electric output, and its thermal energy would be utilized by about 46–49%. Further, the present system is environmentally acceptable without cofiring, so the natural gas, if desired, could be applied only in peak periods, with just coal otherwise being used as the only fuel. This is an advantageous flexibility provided by the present system.

It has also been explained above that the introduction of water into the hot gases tends to reduce $NO_x$ emission levels. This can be accomplished as described above by direct injection of water into the reactor. In the alternative, the water can be injected elsewhere in the gas flow lines upstream from the gas turbine, for example downstream of the hot gas cleanup.

Figure 14:
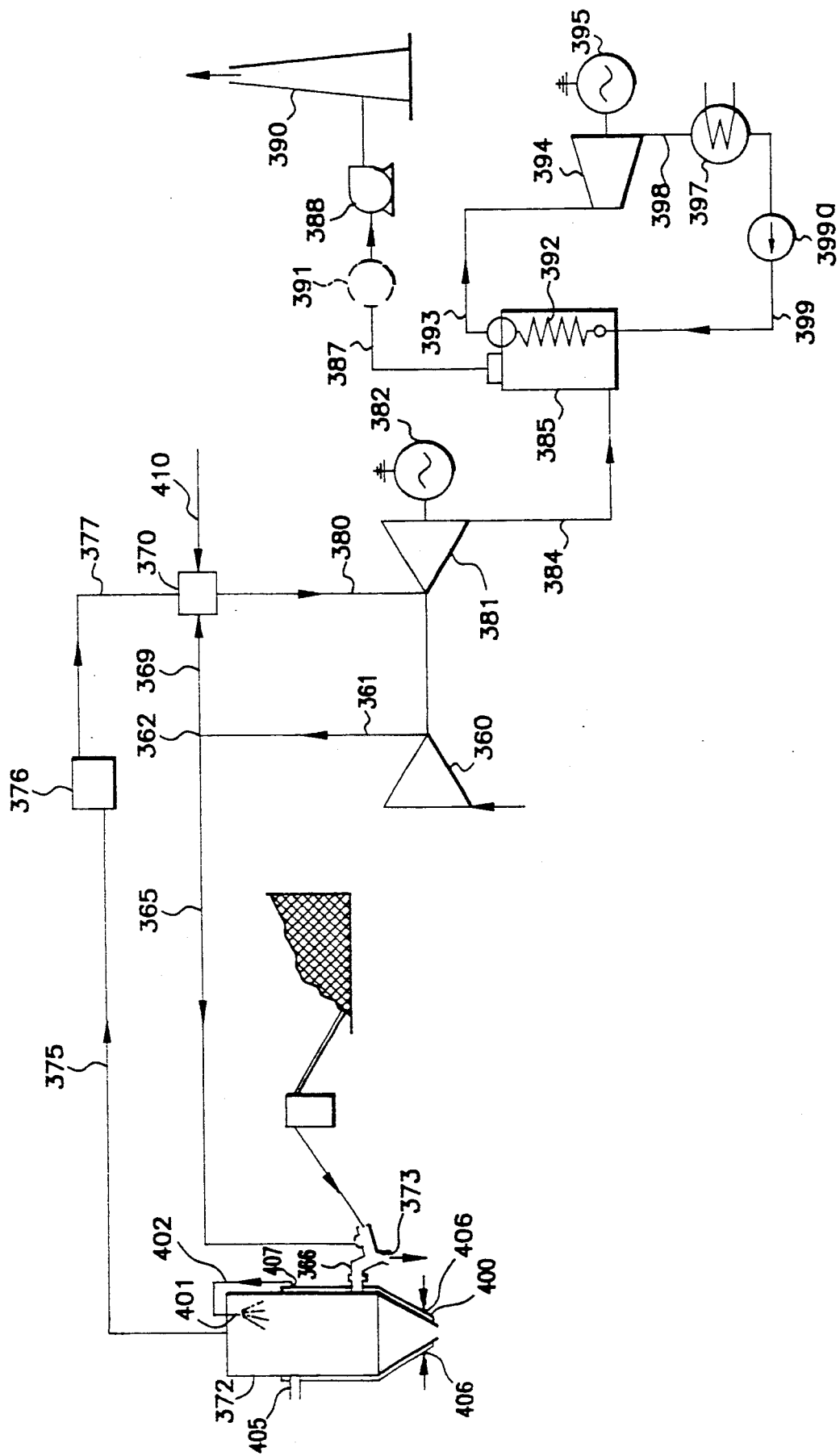

In FIG. 14, an alternate arrangement utilizing a booster burner is shown. The particular flow scheme of FIG. 14 utilizes a direct water injection to the reactor, and the air fed to the booster burner is compressed air from the compressor system. An optional auxiliary fuel line to the booster burner is shown, for use in the event that the reactor is operated to achieve substantially complete oxidation of the gases from the slagging combustor and an auxiliary fuel is needed at the burner. It will be understood from previous discussions, however, that, if desired, the processes in the reactor can be conducted to less than complete combustion, with combustible gases therefrom utilized as fuel for the booster burner.

Referring to FIG. 14, air is shown directed into compressor 360, with pressurized gases coming off the compressor at line 361. At 362, the air line is split, with line 365 directing air into slagging combustor 366, and with line 369 directing compressed air into booster burner 370, without preheating.

Output gases from slagging combustor 366 are directed into reactor 372, with slag removed at 373. The gases from reactor 372 are shown directed via line 375 to hot gas cleanup 376. Gases from hot gas cleanup 376 are shown directed via line 377 to the booster burner 370. In the booster burner 370, the temperature of the gas is increased, and hot gases therefrom are shown directed via line 380 to gas turbine arrangement 381 for power generation at generator 382. Off gases from the gas turbine arrangement 381 are shown directed via line 384 to the heat recovery boiler 385. The cooled gases from the heat recovery boiler are shown drawn off at line 387 through fan 358 to stack 390. An optional condenser 391 in line 387 may be used. Steam from heat exchanger 392 in the heat recovery boiler 385 is shown directed via line 393 to steam turbine 394 for power generation at generator 395. Expanded steam/water from steam turbine 394 is shown directed to the condenser 397 via line 398, before recirculation via line 399 and pump 399a.

The schematic of FIG. 14 includes direct cooling from injection of water into reactor 372. To provide for this in a preferred manner, the scheme of FIG. 14 includes a water jacket 400, in association with the reactor 372, for preheating the water, with water directed to injector 401 via line 402. Selective introduction of sorbent is shown via input 405. Water entry to jacket 400 is shown at 406. Water outlet is shown at 407.

It will be understood that a booster burner such as burner 370 may be utilized downstream from the hot gas cleanup, regardless of whether or not a direct cooling arrangement, for injection of air or water, is utilized at the reactor.

As previously explained, the burner 370 may be operated either utilizing partially oxidized gases from the reactor 372 as fuel, or through utilization of auxiliary fuel (or both). An optional line for provisions of auxiliary fuel to burner 370 is shown at 410.

4. Indirect Cooling by Water

In some applications, it may be desirable to cool hot gases in or from the reactor indirectly by fluid, for example water. Such cooling would result in no change in mass of the gases, but only a lowered temperature. Because the mass of the gases would not be changed, a smaller hot gas cleanup device could be applied relative to situations in which the mass of the gas has been increased by injection of water and/or air. Alternatively, higher gas flow rates (relative to gases having water injected therein) through the hot gas cleanup device could be used. Also, such an arrangement would not necessarily have a demand for extra water input, since the cooling water (of the heat exchanger) could very efficiently be recycled or used in steam generation. If desired, however, some or all of the heated water from the heat exchanger could be injected into the gas stream, for example, downstream of the hot gas cleanup to further control NO$_x$ emission levels.

Figure 15:
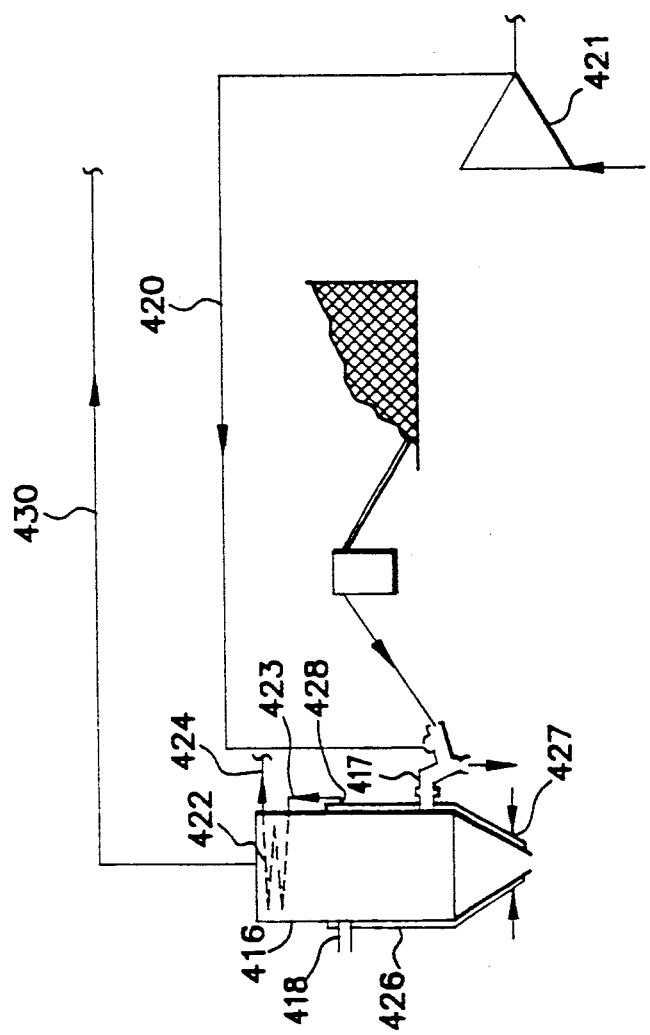

In FIG. 15, a reactor arrangement utilizing indirect cooling by water is shown. Referring to FIG. 15, the reactor is shown at 416, serviced by slagging combustor 417 and including sorbent input means 418. Compressed air is directed to the slagging combustor 417 via line 420, from compressor 421.

The reactor 416 includes therein cooling means comprising a heat exchanger coil 422 through which cooling fluid (water) can be directed, the input to coil 422 being indicated at 423, output at 424. Water directed to inlet 423 may be preheated water, for example from a water jacket such as jacket arrangement 426 of reactor 416. Jacket arrangement 426 includes water input 427 and outlet 428. Preferably heat exchanger coil 422 is positioned within reactor 416 in an upper portion (preferably upper half) thereof, out of direct impact flow of gases from slagging combustor 417, as they enter the reactor 416.

Gases from reactor 416 are shown drawn off at line 430. The gases will, in general, be directed to hot gas cleanup, not shown, analogous to previously described figures. The gas flow from hot gas cleanup may be used in power generation as previously described.

There are numerous possibilities for utilization of the hot cooling fluid from exchanger 422, for example water. For example, the heated fluid can be utilized for process heating. It can also be utilized for additional power generation in the bottom steam cycle. Again, it can be directed into the gas line downstream of the hot gas cleanup, for example to control NO$_x$ emissions.

Figure 16:
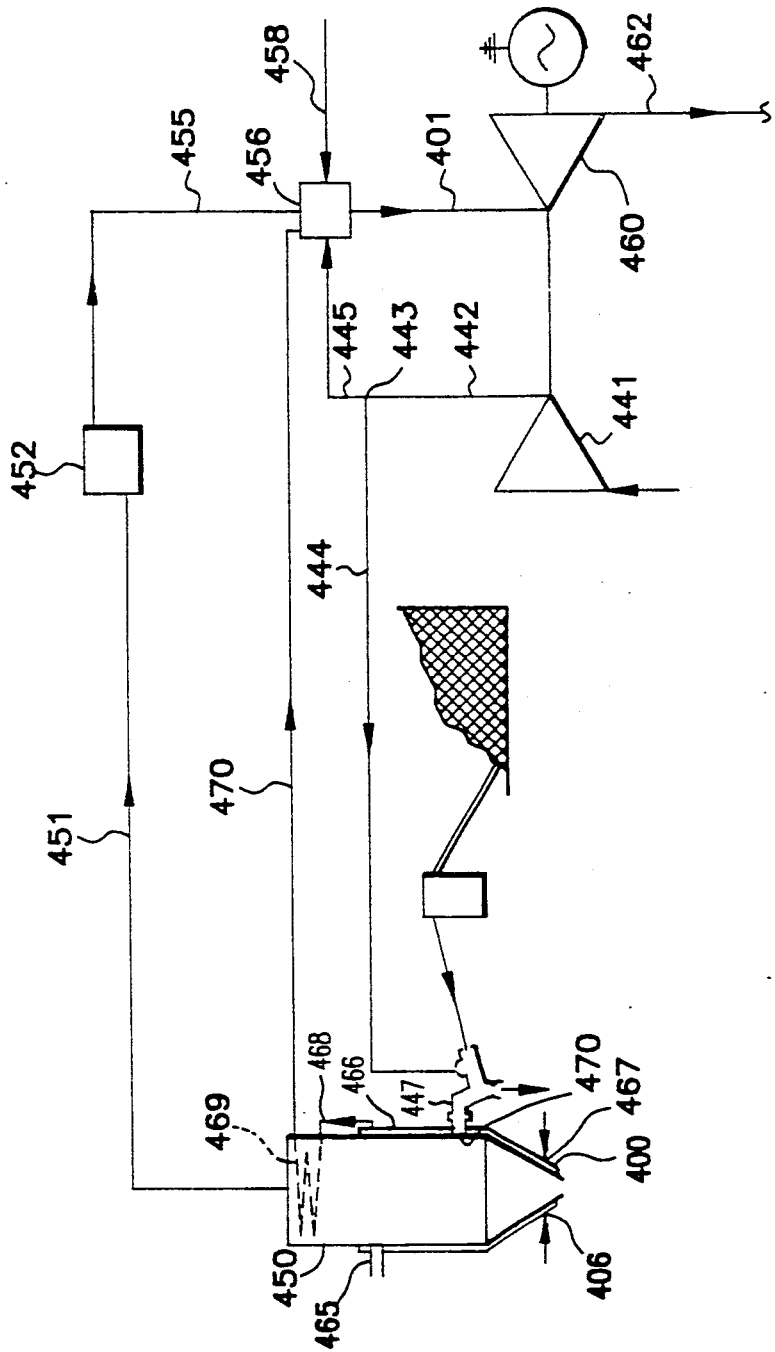

FIG. 16 illustrates an arrangement utilizing indirect cooling of hot gases by water, with the cooling water eventually utilized for power generation in both the gas and the steam cycles. For the particular schematic of FIG. 16, the temperature of gases from the reactor is shown elevated by means of a booster burner as described earlier, located downstream from the hot gas cleanup.

Referring to FIG. 16, compressor 441 is utilized to compress air, directing same into line 442. At 443 the compressed air line 442 is split into segments 444 and 445, respectively. Air line 444 is fed to slagging combustor 447, and ultimately into reactor 450. The gases leave reactor 450 through line 451 and are directed through hot gas cleanup arrangement 452. Outflow from the hot gas cleanup arrangement 452 is shown at line 455, directed into booster burner 456. Air from line 445 is also shown directed into booster burner 456 to provide compressed air for combustion processes therein. An optional auxiliary fuel line 458 is shown directed into booster burner 456. The off gas flow from the booster burner 456 is shown directed into gas turbine arrangement 460 via line 461. Off gases from the gas turbine are shown at 462. These gases may be directed into a heat recovery boiler/steam turbine arrangement as previously described.

Means for sorbent input to reactor 450 is shown at input 465. A cooling water jacket for reactor 450 is shown at 466, with water input at 467 and outlet at 468. Water from outlet 468 is shown transferred to heat exchange cooler arrangement 469, whereby gases in reactor 450 are cooled and water in arrangement 469 is heated further. Some of the water output from the heat exchange unit 469 is shown directed via line 470 into the gas stream downstream of hot gas cleanup 452, to increase mass and control NO$_x$. Heat exchange unit 469 is oriented in an upper region of reactor 450, out of immediate vicinity of input from slagging combustor 447, at 470.

By the arrangement of FIG. 16, indirect cooling of gases in the reactor occurs; thus, the temperature of the gases is controlled for hot gas cleanup without an increase in the mass of the gases, which would otherwise cause less efficiency for gas cleanup (i.e. a greater volume of gases would have to be cleaned of the same volume of particulates) or would require a larger cleaning device. The mass of the gases is increased before introduction to the gas turbine 460, however, via air input at line 445, and, if used, water input via line 470. Also, NO$_x$ emissions are controlled by selective water input via line 470, the water having been utilized as an indirect coolant for gases in reactor 450. Any water utilized to control NO$_x$ emissions will result in an increase in the mass of the gases flowing into the gas turbine, thus increasing efficiency. The increase through water input, however, occurs downstream from hot gas cleanup, again facilitating efficiency.

5. Indirect Cooling by Air

Figure 17:
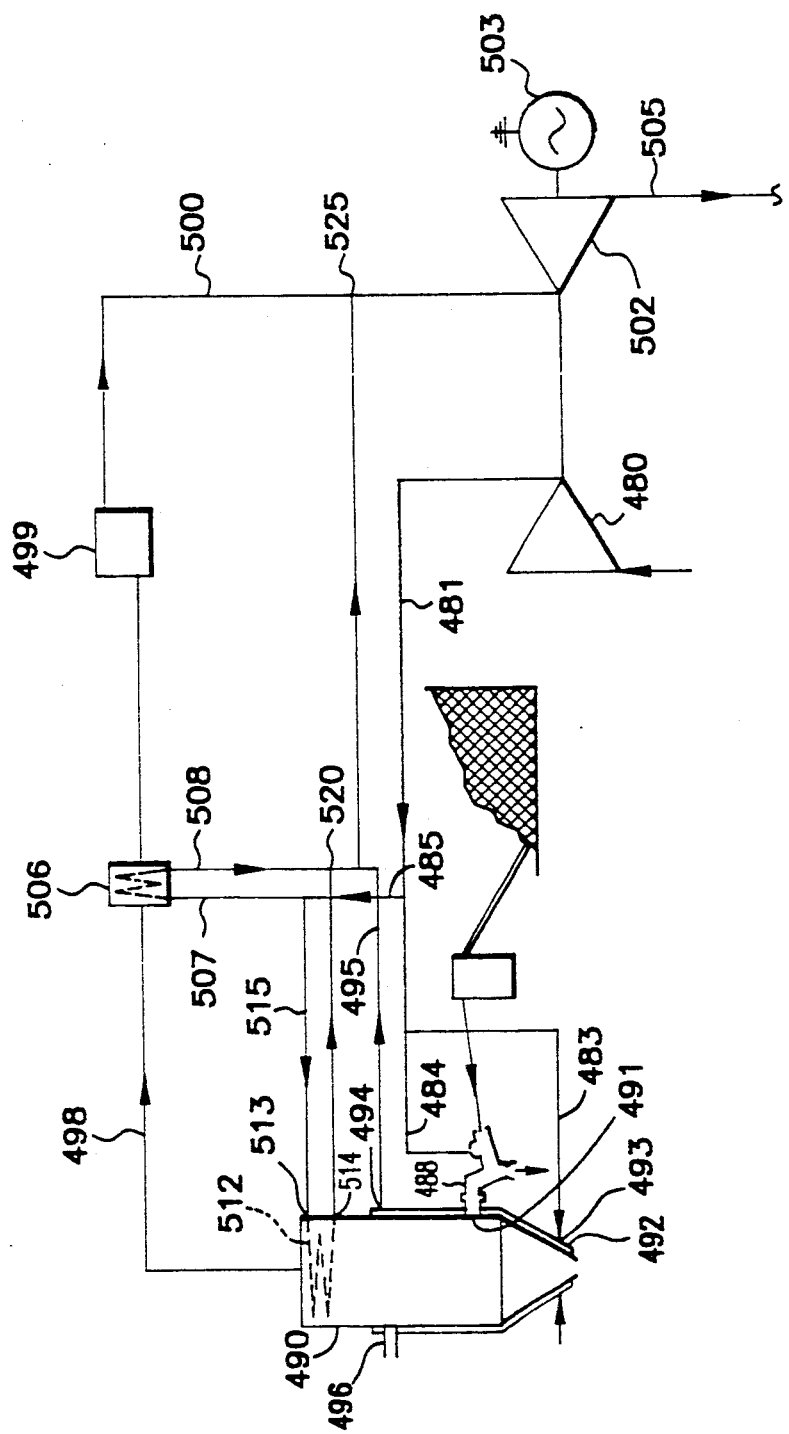

In FIG. 17, a schematic illustrating alternate indirect cooling by fluid, in this instance air rather than water, is presented. In FIG. 17, the air input is shown compressed at compressor 480. An air line of compressed air from compressor 480 is shown at 481. The compressed air line 481 is optionally split into three compressed air lines 483, 484 and 485. Line 484 is the main compressed air line to the slagging combustor 488, and ultimately reactor 490 via input 491. Line 483 directs cooling air into cooling jacket 492 around reactor 490, input being indicated at 493. Output from the heat jacket is indicated at 494 through line 495. Sorbent input to reactor 490 is shown at 496.

Combusted gases from reactor 490 are shown drawn off at line 498 and directed to hot gas cleanup arrangement 499. Output from hot gas cleanup arrangement 499 is shown in line 500, directed to gas turbine arrangement 502 for power generation at generator 503, the reduced pressure gases from gas turbine 502 shown being drawn off at line 505. These gases may then be directed to a heat recovery boiler/steam turbine arrangement as previously described.

Two potentially desirable locations for indirect air-cooled heat exchangers are shown in FIG. 17. It will be understood that either or both locations may be utilized. The first heat exchanger 506 is shown in line 498 for cooling gases between reactor 490 and hot gas cleanup 499. Cooling air to heat exchanger 506 is shown input at 507 and removed at 508. Air feed to input 507 is indicated by compressed air line 485; the ultimate source of the compressed air being compressor 480.

A second (or alternate) air-cooled heat exchanger is shown in reactor 490 at 512. Exchanger 512 is positioned in an upper region of reactor 490, well out of immediate vicinity of input from slagging combustor 488, at 491. Compressed air entry into heat exchanger 512 is shown at 513, with hot gas output at 514. Feed to inlet 513 may be from compressor 480. In FIG. 17, the arrangement is shown with both heat exchangers 506 and 512 in operable position, with output gases therefrom collected together at 520.

For the arrangement of FIG. 17, cooling fluid output (at least in part) from either or both of the heat exchangers 506 and 512 is directed into the combustion gas line downstream of the hot gas cleanup 499. In FIG. 17 this occurs via feed into the combustion gas line 500 downstream of hot gas cleanup arrangement 499 at 525. This will tend to increase the mass of the gases in line 500, fed to gas turbine 502. The increase will have occurred in an advantageous manner, since the compressed air from heat exchangers 506 and 512, although heated thereby, is clean and therefore does not need to pass through hot gas cleanup arrangement 499. This means the hot gas cleanup arrangement 499 is utilized to a more efficient extent. Another advantage is that dilution of the gases in line 500 will have occurred, with a resultant dilution in concentration of any contaminants. For the arrangement shown in FIG. 17, gases transferred to juncture 525 also optionally include gases from line 495, i.e., output gases from jacket 492.

From the above, it will be apparent that advantages from using indirect cooling of air include: possible reduced size of air purification devices to achieve clean gas emissions; direct utilization of added air for power generation for efficiency; and, reduced contaminant concentrations due to dilution. Further, when air is used instead of water, there is less dependence upon possibly limited fluid supplies.

The schematic of FIG. 17, however, requires a high-temperature heat exchanger arrangement for pressurized cooling air. The accomplishment of such an arrangement, in the past, has presented a problem.

Depending on the type of gas turbine, the cooling air should be compressed in the range of about 2-30 atmospheres, and it will have been heated to 1700° F. or more. The hot coal gases in the reactor typically exceed about 2200°-2600° F., and currently there is no steel or steel alloy commercially available for construction of such a high-temperature, pressurized, gas heat exchanger.

Ceramic tubes, or ceramic heat exchangers, have good temperature resistance. However, the walls of ceramic tubes for pressurized air are thick (0.75 inches or more), and the lengths are typically limited (usually 4 feet or less). For such arrangements, provision of tight pipe connections has been difficult, and there are additional difficulties with compensation for thermal expansion, contraction and thermal stress as well.

For the arrangement shown in FIG. 17, with the exchanger inside of the reactor, the unique integration of the slagging combustor with the reactor provides simplification in selection of design and size of the heat exchanger inside the reactor, in part because pressures on both sides of the heat transfer surface can be made approximately equal. Because of this, longer heat transfer pipes with relatively thin walls can be used. Tightness problems are practically eliminated; heat transfer conditions improve; the size and weight of the heat exchanger is drastically reduced; and, thermal stress and expansion and contraction problems are generally simplified or avoided. All of these factors result in substantial cost reductions, improved operational availability and reduced maintenance requirements.

Figure 18:
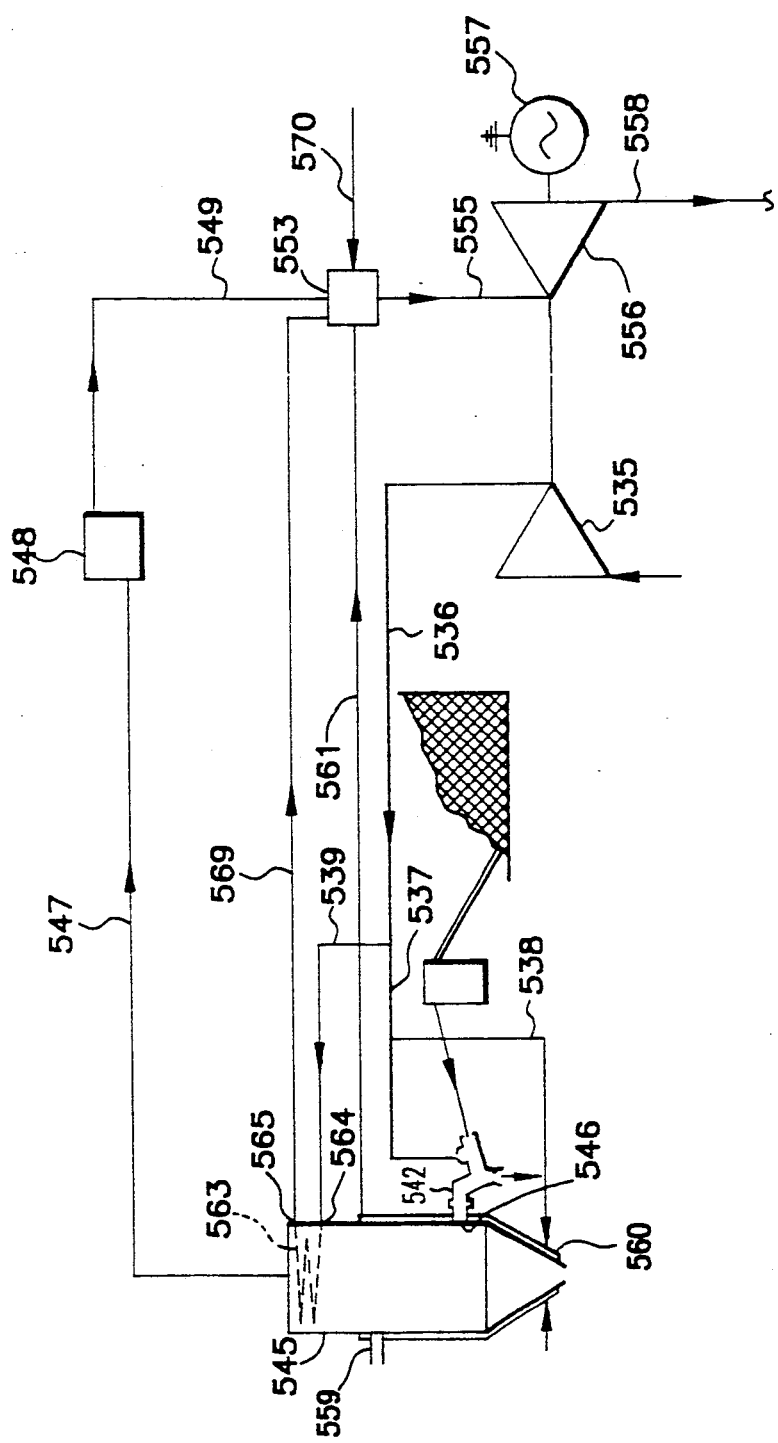

In some applications, it will be advantageous to utilize indirect cooling by air in association with a booster burner. A schematic illustrating this is provided in FIG. 18. Referring to FIG. 18, compressed air is shown generated at compressor 535. The compressed air is shown drawn off compressor 535 in line 536. Line 536 is optionally split into three lines 537, 538 and 539. Line 537 provides a main feed of compressed air to the slagging combustor 542, and ultimately compressed combustion gases pass from the slagging combustor 542 to reactor 545, at 546. Compression gases from reactor 545 are shown drawn off at line 547 for direction through hot gas cleanup arrangement 548. Off gases from hot gas cleanup 548 are shown drawn off at line 549 for direction into booster burner 553. Off gases from booster burner 553 are shown directed via line 555 to gas turbine 556 for power generation at generator 557. The off gases from turbine 556 are shown at line 558. Sorbent input at reactor 545 is shown at 559.

Some of the compressed air from line 556 is shown directed into a cooling jacket arrangement associated with the reactor 545. More specifically, spur line 538 is shown directing cooling compressed air into jacket arrangement 560, with off gases from jacket 560 shown directed via line 561 outwardly therefrom. For the particular arrangement shown in FIG. 18, off gases from line 561 are shown selectively directed into booster burner 553.

Spur line 539 is shown directing cooled compressed air into air-cooled heat exchange arrangement 563 for cooling process gases from the reactor 545. The particular heat exchanger arrangement 563 of FIG. 15 is shown positioned inside an upper portion reactor 545, well out of immediate vicinity of gas flow from slagging combustor 542, with input indicated at 564 and cooling gas output indicated at 565. Output gases from 565 are shown directed via line 569 into the combustion gas stream at a location downstream from the hot gas cleanup arrangement 548. For the particular arrangement shown in FIG. 18, line 569 is shown selectively introducing compressed air cooling gas from arrangement 563 into the combustion gas line downstream from hot gas cleanup 548 at the booster burner 553. It will be understood, however, that the gases from line 569 can be introduced at any of a variety of locations in lines 549 and 555. An optional auxiliary fuel line for burner 553 is indicated at 570.

6. Coproduction of Combustible Coal Gas and Electric Power

As explained previously, the extent of combustion within the reactor can be controlled, so that, if desired, the output from the reactor can be a combustible gas relatively free of sulfur dioxide components and, if desired, $NO_x$ emissions. This, again, is due to the unique arrangement of the slagging combustor and reactor, facilitating cleanup within the reactor itself. Hot combustible gases from the reactor, then, if desired, can be split into two streams: a first stream utilized to generate power in a combined cycle arrangement as previously described; and, a second stream usable as a coal gas fuel line. A schematic illustrating such usage is shown in FIG. 19.

Figure 19:
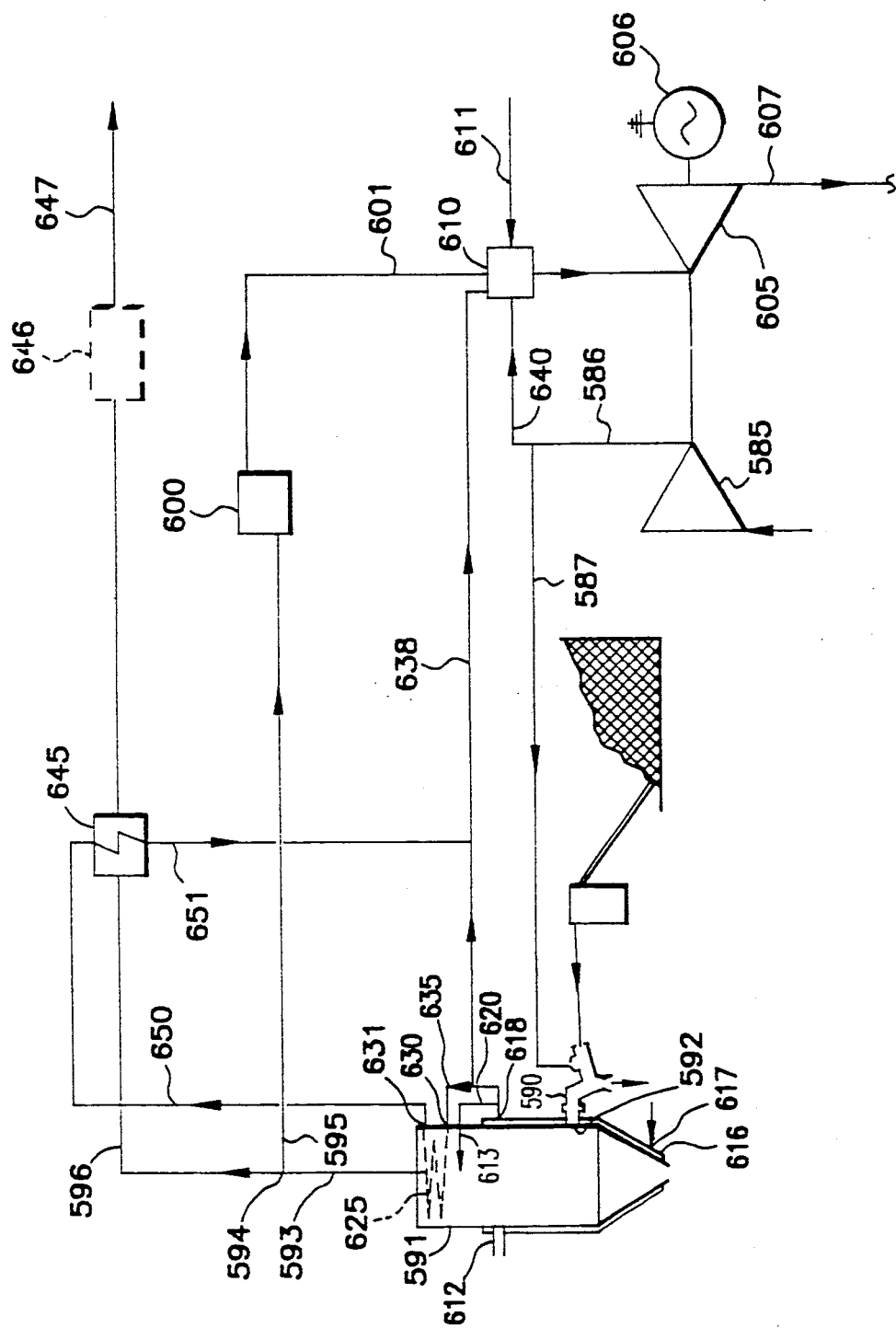

Referring to FIG. 19, air is introduced into compressor 585 for compression to the process pressures of the system. The compressed air line from compressor 585 is illustrated at 586. The compressed air is shown directed via line 587 to slagging combustor 590 and into reactor 591 at 592. Off gases from reactor 591 are shown at 593. The off gases from line 592 are split at 594 into a first line 595 utilized for direct power generation, and a second line 596 ultimately utilized as a combustible gas line.

Line 595 is shown directing the hot gases to hot gas cleanup arrangement 600. Off gases from hot gas cleanup 600 are shown directed via line 601 to gas turbine 605 for power generation at generator 606. Low pressure output from gas turbine 605 is illustrated at line 607. This may be directed to a heat recovery boiler, as previously described, if desired.

When the slagging combustor 590 and reactor 591 are operated under conditions to provide for a combustible gas output, after hot gas cleanup 600 it may be desirable to provide a booster burner to achieve complete oxidation of the gases and raise the temperature of the gases to a desirable temperature for the gas turbine 605. To accomplish this, line 601 is directed through booster burner 610, positioned upstream from gas turbine 605. An optional auxiliary fuel line is shown directed into booster burner 610 at 611.

Selective sorbent input to reactor 591, to provide reduction in $SO_2$ concentration and, if desired, for other chemical modifications, is illustrated at 612. An arrangement for selective direct water input, if desired to control $NO_x$ emissions, is illustrated at 613.

Reactor 591 is shown fitted with the cooling jacket 616. The particular cooling jacket illustrated at 616 is cooled by means of cooling water input at 617, drawn off at 618. For the arrangement shown in FIG. 19, water for direct input to reactor 591 and injector 613 is obtained via line 620 from jacket output 618.

The arrangement of FIG. 19 is shown provided with an indirect heat exchanger arrangement 625 in reactor 591. The heat exchanger arrangement 625 may be either air or water cooled. The particular arrangement 625 of FIG. 19 is shown cooled via water input from line 630, with output from line 631. Water feed inlet 630 is shown provided from line 635.

If it is desirable to maintain the mass of gases leaving reactor 591 to a minimum, for example to facilitate hot gas cleanup, it may be desirable to introduce water into the system downstream from the hot gas cleanup arrangement 600. In FIG. 19, this is shown optionally obtained via line 638. For the arrangement shown in FIG. 19, line 638 is shown introducing water into gases downstream from the hot gas cleanup arrangement 600 at the location of the booster burner 610. Via this method, gas mass is increased downstream of hot gas cleanup arrangement 600, but upstream from gas turbine 605; and, $NO_x$ emissions are controlled in the power generation line, i.e., in line 594 downstream from split 593.

In FIG. 19, an optional compressed air feed line into the arrangement downstream from hot gas cleanup 600 but upstream from compressor 605 is illustrated by compressed air spur line 640. For the particular arrangement shown, line 640 is shown feeding into the offstream 601 from hot gas cleanup 600 at the location of the booster burner 610.

Combustible gas in line 596 is shown directed through heat exchanger 645 to cool the same to a relatively low temperature, for example about 300° F., for a low-temperature gas cleanup at arrangement 646, before being fed via line 647 to a remote location for use as fuel. Heat exchanger 645, in FIG. 19, is illustrated as a water cooled arrangement, with inlet water flow from line 650 and outlet water at 651. Water in lines 650 and 651 is shown communicating with lines 635 and 638, respectively, for convenience in water flow pattern.

Flexibility in Application with Respect to Existing Power Generation Systems The unique and flexible arrangements described herein may be applied to the rehabilitation or regeneration of existing, but for various reasons undesirable, power generation equipment. The following hypothetical examples will serve to illustrate this.

EXAMPLE 1

Repowering Existing Boiler/Steam Turbine Systems

Power generation facilities are known to exist configured generally according to FIG. 1, i.e. with the combustion boiler and steam turbine generation systems. Many such systems, especially when coal fired, do not have adequate emission controls for sulfur dioxide levels. Also, many have problems with $NO_x$ emissions and particulates. Therefore, in some instances, alternate fuels have been utilized for the boilers, in others the capacity of systems have been reduced. Some have simply been shut down and left in place. In still other systems, expensive work has been undertaken with respect to downstream scrubbing of off gases from the heat recovery boiler. Problems with respect to this, relating to overall efficiency of use of the heat recovery boiler, were described above.

According to the present invention, such a power plant can be repowered through provision of a slagging combustor/reactor arrangement according to the present invention upstream from the heat recovery boiler to provide hot coal gases thereto. Preferably, the arrangement includes provision of a gas turbine power generation system in the gas flow to the heat recovery boiler to facilitate efficiency of power generation through combined cycle power generation. Thus, such an arrangement as described above can be efficiently reconfigured to an arrangement such as that shown in FIG. 4. Problems with cleanup of gases from the boiler (modified to a heat recovery system from a combustion boiler) are avoided, since reactor $SO_2$ control is achieved. Further, through water injection as described, $NO_x$ emissions can be controlled. Efficiency of the boiler can be improved, since the gases passing therethrough can be cooled to a greater extent. Of course the air preheat arrangement can be discarded, because combustion would not take place in the boiler. Rather, the boiler would be modified to merely serve as a heat exchanger.

EXAMPLE 2

Repowering Combined Cycle Arrangements

Figure 2:
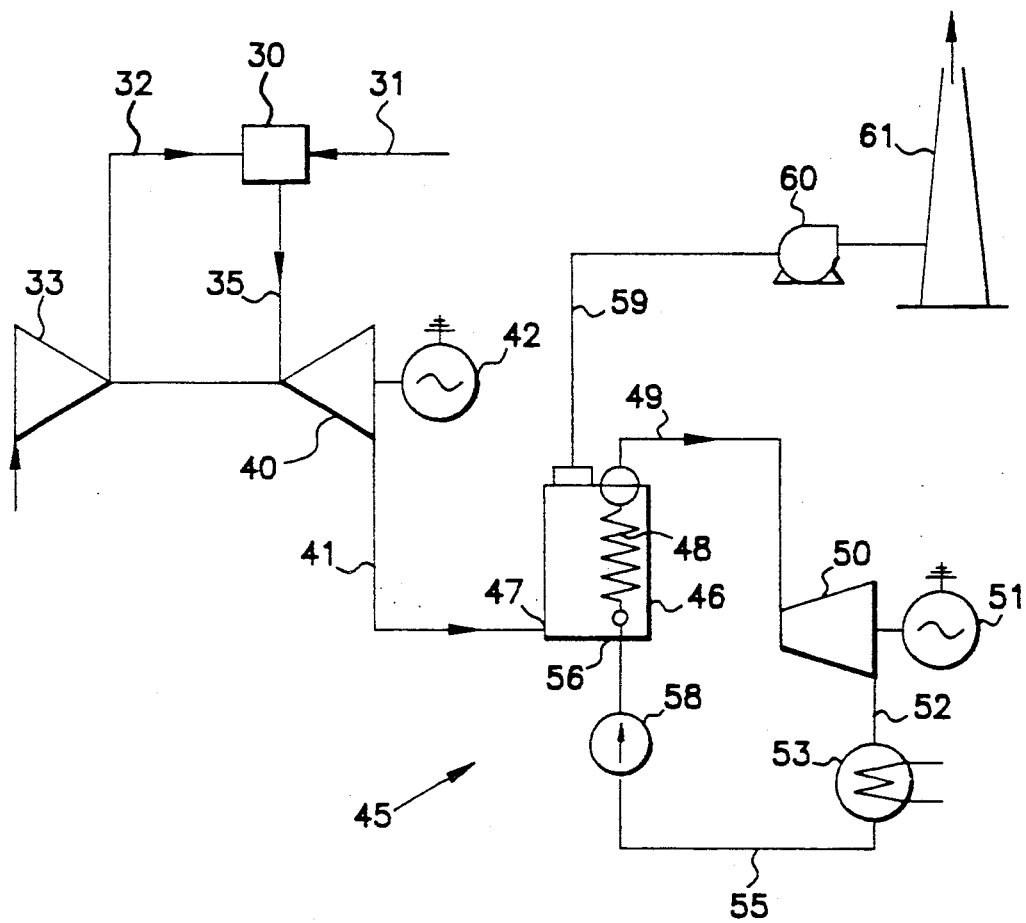

The conventional combined cycle arrangement shown in FIG. 2, as described above, is generally powered with natural gas. A gas turbine for such an arrangement is not appropriately adapted for receipt of conventionally derived hot coal gases, at least without hot gas cleanup. As explained above, hot gas cleanup in the past has been a problem for certain methods by which the coal gas is generated. Further, in the arrangement of FIG. 2 there are problems with handling of sulfur dioxide in the coal gas, control of $NO_x$ emission and efficient use of the heat recovery boiler in a second cycle.

The arrangement of FIG. 2 can be repowered by provision upstream of the gas turbine a slagging combustor/reactor/hot gas cleanup arrangement as described above with respect to FIG. 4. $SO_2$ control is achieved upstream of the combined cycle power generation, eliminating the need for expensive and complicated scrubber arrangements downstream of the heat recovery boiler. Further, the heat transfer efficiency of the heat recovery boiler is increased, and greater efficiency of energy use is obtained. $NO_x$ control can be readily obtained by introduction of water into the gases upstream from the gas turbine, if desired.

Sample Specifications for a Power Plant

The following specifications for a power plant will further assist in an understanding of the present invention. The specifications are exemplary only, and a wide variety of arrangements and specifications could be used. The specifications do provide, however, some basis for comparison to previous known power arrangements.

Assume, for example, that it is desired to provide a power plant capable of producing 31 megawatts (MWe) of electricity. This could be accomplished, by providing a combined cycle arrangement producing 21 MWe in a gas turbine cycle, and 10 MWe from the steam turbine cycle. Using the general embodiment of FIGS. 4 and 13, specifications to achieve this could be as follows:

1. Using coal having a heating value of 8,500BTU/lb, providing a coal flow to the slagging combustor of about 7.4 lb/sec. The coal should be provided with a particle size average of about 0.55 mm, and should be provided at the same pressure as the gas flow to the slagging combustors, i.e. 176.4 or about 12 atm.

2. Air to the air compressor will be assume to be provided at atmospheric pressure (14.7 psi) and an ambient temperature of 78° F. The flow rate to the compressor should be about 167 lb/sec.

3. The compressed air should be provided to the slagging combustor at a temperature of 500° F. and a flow rate of 30 lb/sec, and a pressure of 176.4 psi (12 atm). The temperature of the gases at 500° F. will have resulted from mixing air from the compressor at 300° F. with heated air from the jacket.

4. Thus, inside the reactor, gases from the combusted coal and air are being mixed. If lime is utilized as the sorbent, it should be provided with an average particle size of about 0.5 mm. The amount of sorbent would preferably be within a mole ratio of about 2-2.5 calcium to sulfur. The amount of sulfur can be calculated, from the sulfur content of the coal.

5. Off gases from the reactor should be provided at about 1800° F., at a rate of 174 lb/sec and a pressure of 176.4 psi (12 atm). Since the gases from the slagging combustor will be at about 2,600° F. cooling within the reactor was necessary. For the particular arrangement described at FIG. 13, cooling within the reactor is conducted via injection of cooling air. The rate of cooling air introduction, assuming pressure of 12 psi and flow rate of 30 lb/sec and temperature of about 1,400° F. from the cooling jacket, will be at a rate of about 136.6 lb/sec.

6. The hot gas clean up will result in little if any drop in temperature of the gases, thus off gas flow from the hot gas clean up will be at about 174 lb/sec, 176.4 psi (12 atm) and 1800° F. With conventional gas turbine systems, this can be utilized to produce about 21 MWe of energy, with off gases from the gas turbine at about 975° F., flow rate 174 lb/sec.

7. The off gases from the gas turbine can be utilized in a heat recovery boiler to be cooled to about 200° F., providing steam at 600 psig, 750° F. at a rate of 25 lb/sec. The steam can be utilized to produce approximately 10 MWe of energy. The steam can be cooled with circulating water flow, with about a 2 inch condenser. Off gases from the heat recovery boiler at about 200° F. and 174 lb/sec can be discharged to the atmosphere through a conventional stack system, without cleaning or further heating. The overall thermal efficiency of the arrangement described above, would be about 47%. The preferred residence time within the reactor will be on the order of about 25 or 35 seconds for the system discussed.

In Table 1 below, some example gas flow rates and component sizes for various plants, according to the present invention are shown. The table may be interpreted, for example, as follows. If the combined cycle capacity is to be 30 MWe, with about 10 MWe from the steam cycle and about 20 MWe from the gas turbine cycle, then:

(a) approximate gas flow and volumes are shown in Section B of the table, under the 30 MWe column;
(b) gas volumes at 1,850° F. for 3 different pressure ratios (8/1; 12/1 and 16/1; for example pressure reduction from 8 atm to 1 atm in the gas cycle is a Pr of 8) are as shown in Section C of the table;
(c) appropriate reactor diameters, assuming a single reactor system of 50 ft. height, for the various pressure reduction ratios are shown in Section D of the table;
(d) appropriate duct diameters are shown in Section E of the table, for the various pressure reduction ratios; and,
(e) filtration area needed for hot gas cleanup is shown in Section F of the table.

In the table: SCFM=standard cubic feet per minute, ACFM=actual cubic feet per minute; and, the filtration areas are provided in square feet.

1) At 300FPM velocity.
2) At 3,000FPM velocity.
3) At 12FPM/ft² velocity.

| Total Capacity, MWe | 30 | 50 | 75 | 100 | 150 | 200 |
|---|---|---|---|---|---|---|
| A. | | | | | | |
| Steam Cycle Capacity, Mwe | 10 | 16 | 25 | 34 | 50 | 65 |
| Gas Turbine Capacity, Mwe | 20 | 34 | 50 | 66 | 100 | 135 |
| B. | | | | | | |
| Approximate Gas Flow, lb/sec | 180 | 306 | 450 | 594 | 900 | 1,215 |
| Gas Volume - Standard, Vs, Ft3/sec | 2,400 | 4,080 | 6,000 | 7,920 | 12,000 | 16,200 |
| Gas Volume - Standard, Vs, SCFM | 144,000 | 244,700 | 360,000 | 475,000 | 720,000 | 972,000 |
| C. | | | | | | |
| Gas Volume at 1,850 F and pressure | | | | | | |
| ratio Pr = 8 atm (ACFM) | 82,000 | 139,400 | 205,000 | 207,600 | 410,000 | 553,800 |
| 12 atm (ACFM) | 54,700 | 92,900 | 136,700 | 180,400 | 273,500 | 369,200 |
| 16 atm (ACFM) | 41,000 | 69,700 | 102,500 | 135,300 | 205,100 | 276,900 |
| D. | | | | | | |
| Reactor Diameter, single | | | | | | |
| for 50 ft height (1) | | | | | | |
| Pr = 8 atm (ft) | 18.6 | 24.3 | 29.5 | 33.9 | 41.7 | 48.5 |
| 12 atm (ft) | 15.2 | 19.75 | 24.1 | 7.7 | 34.0 | 39.6 |

| Total Capacity, MWe | | 30 | 50 | 75 | 100 | 150 | 200 |
|---|---|---|---|---|---|---|---|
| 16 atm (ft) | | 13.2 | 17.2 | 20.9 | 24.0 | 29.5 | 34.3 |
| E. | | | | | | | |
| Duct Diameter, Single | (2) | | | | | | |
| Pr = 8 atm (ft) | | 5.9 | 7.7 | 9.3 | 10.7 | 13.2 | 15.3 |
| 12 atm (ft) | | 4.8 | 6.3 | 7.6 | 8.8 | 10.8 | 12.5 |
| 16 atm (ft) | | 4.2 | 5.4 | 6.6 | 7.6 | 9.3 | 10.8 |
| F. | | | | | | | |
| Filtration Area needed | (3) | | | | | | |
| Pr = 8 atm (ft) | | 6,800 | 11,600 | 17,000 | 22,550 | 34,200 | 46,150 |
| 12 atm (ft) | | 4,560 | 7,740 | 11,400 | 15,000 | 22,800 | 30,800 |
| 16 atm (ft) | | 3,420 | 5,800 | 8,540 | 11,300 | 17,100 | 23,000 |

What is claimed and desired to be secured by Letters Patent is as follows:

1. An apparatus for producing coal gas; said apparatus comprising:
   (a) a slagging combustor apparatus constructed and arranged for burning coal and producing:
      (i) raw coal gas having a pressure of at least about 2 atmospheres and a temperature of at least about 2200° F.; and,
      (ii) ash as liquid slag; said slagging combustor apparatus including means for separating at least about 90% of the ash as liquid slag from the raw coal gas;
   (b) a reactor apparatus having a reactor chamber with a generally circular horizontal cross-section and defining a central, substantially vertical, axis;
      (i) said reactor a chamber having: an upper portion; and, a lower portion; said reactor chamber upper portion having an exit port therein, for off flow of product gases from said reactor chamber; said reactor portion lower portion being characterized by an absence therein of internally projecting components of sufficient size and shape to interfere with gas flow through said reactor chamber lower portion;
      (ii) said reactor apparatus having a raw coal gas inlet apparatus constructed and arranged for directing the raw coal gas, after separation of at least about 90% of the ash as liquid slag therefrom, into said reactor chamber lower portion along a helical path of motion about said reaction chamber central, substantially vertical, axis;
      (iii) said reactor apparatus including a sorbent injector arrangement constructed and arranged to inject sorbent material into said reaction chamber at a location spaced from said raw coal gas inlet arrangement;
      (iv) said reactor apparatus including means for separating sorbent material from gases within said reaction chamber before the gases are directed through said exit port in said reactor chamber upper portion; and,
      (v) said reaction chamber being sized and configured for a retention time, of gases flowing therethrough during operation, of at least about 15 seconds.

2. An apparatus according to claim 1 including:
   (a) a water injection apparatus constructed and arranged to selectively inject water or steam into said reaction chamber at a location spaced from said raw coal gas inlet apparatus.

3. An apparatus according to claim 1 including:
   (a) an air injection apparatus constructed and arranged to selectively inject air into said reaction chamber at a location spaced from said raw coal gas inlet apparatus.

4. An apparatus according to claim 1 including:
   (a) a hot gas cleanup apparatus for substantially removing particulate material from gases having a temperature of at least 1700° F.; and
   (b) means for directing gas flow from said reactor chamber, through said exit port in said reactor chamber upper portion and through said hot gas cleanup apparatus.

5. An apparatus according to claim 1 including:
   (a) a booster burner apparatus; and,
   (b) means for directing gas flow from said reaction chamber to said booster burner apparatus.

6. An apparatus according to claim 1 including:
   (a) a heat exchanger: positioned within said reaction chamber upper portion; and, constructed and arranged for selected cooling of gases within said reactor chamber.

7. An apparatus according to claim 6 wherein said heat exchanger comprises an air cooled system.

8. An apparatus according to claim 6 wherein said heat exchanger comprises a water cooled system.

9. An apparatus according to claim 1 including means for recycling sorbent separated from gases in said reaction chamber back through said reaction chamber.

10. An apparatus for producing power from coal; said apparatus comprising:
    (a) a slagging combustor apparatus constructed and arranged for burning coal and producing: raw coal gas; and, ash as liquid slag; said slagging combustor apparatus including means for separating at least about 90% of the ash as liquid slag from the raw coal gas;
    (b) a reactor apparatus having a reactor chamber with a generally circular horizontal cross-section and defining a central, substantially vertical, axis;
       (i) said reactor a chamber having: an upper portion; and, a lower portion; said reactor chamber upper portion having an exit port therein, for off flow of product gases from said reactor chamber; said reactor portion lower portion being characterized by an absence therein of internally projecting components of sufficient size and shape to interfere with gas flow through said reactor chamber lower portion;
       (ii) said reactor apparatus having a raw coal gas inlet apparatus constructed and arranged for directing the raw coal gas, after separation of at least about 90% of the ash as liquid slag therefrom, into said reactor chamber lower portion along a helical path of motion about said reaction chamber central, substantially vertical, axis;

(iii) said reactor apparatus including a sorbent injector arrangement constructed and arranged to inject sorbent material into said reaction chamber at a location spaced from said raw coal gas inlet arrangement;

(iv) said reactor apparatus including means for separating sorbent material from gases within said reaction chamber before the gases are directed through said exit port in said reactor chamber upper portion; and, (v) said reaction chamber being sized and configured for a retention time, of gases flowing therethrough during operation, of at least about 15 seconds.

(c) a hot gas cleanup apparatus for substantially removing particulate material from gases having a temperature of at least 1700° F.;

(d) means for directing gas flow from said reactor apparatus through said hot gas cleanup apparatus;

(e) a gas turbine power generation apparatus; and, (f) means directing gas flow from said hot gas cleanup apparatus through said gas turbine power generation apparatus.

* * * * *